United States Patent [19]

Hostettler

[11] Patent Number: 4,524,102

[45] Date of Patent: Jun. 18, 1985

[54] MICROCELLULAR POLYURETHANE FOAMS HAVING INTEGRAL SKIN

[76] Inventor: Fritz Hostettler, R.F.D. 3, Box 318E, Stillhouse Rd., Freehold, N.J. 07728

[21] Appl. No.: 580,434

[22] Filed: Feb. 15, 1984

[51] Int. Cl.³ .................. B32B 29/00; B32B 3/25; C08J 9/34; C08G 18/14
[52] U.S. Cl. .................. 428/318.8; 428/315.5; 252/182; 521/115; 521/51; 521/905; 521/912; 524/728; 528/52; 560/26
[58] Field of Search ............ 521/115, 905, 51; 528/52; 524/728; 428/315.5, 318.8

[56] References Cited

U.S. PATENT DOCUMENTS

| | | |
|---|---|---|
| 3,839,413 | 10/1974 | Wolff et al. .................. 560/26 |
| 3,993,697 | 1/1976 | Fujii et al. .................. 521/115 |
| 4,189,544 | 2/1980 | Thompson .................. 521/128 |
| 4,287,307 | 9/1981 | Hostettler .................. 521/51 |
| 4,288,577 | 9/1981 | McShane .................. 560/26 |
| 4,334,032 | 6/1982 | Patton et al. .................. 521/115 |
| 4,334,052 | 6/1982 | Patton et al. .................. 560/26 |
| 4,469,616 | 9/1984 | Hostettler .................. 252/182 |

Primary Examiner—Herbert S. Cockeram

[57] ABSTRACT

There are provided a wide range of polyurethane products, e.g., cellular, dense elastomer, and integral skin microcellular products, obtained by the reaction of (a) a polyisocyanate compound, (b) a polyol, (c) optionally a chain extender and/or blowing agent with/without other known additives, (d) in the presence of a non-hydroxyl flow modifier characterized by carbon and hydrogen atoms, at least one and, generally, a plurality of oxyalkylene groups, and at least one urethane,

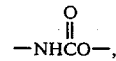

group. Several of the polyurethane products exhibit unique properties, e.g., foamed articles with capability to conduct static electricity, soft elastomers characterized by improved coefficient of friction, etc. Several classes of the flow modifiers are novel per se. The polyurethane products can be synthesized via the one shot or prepolymer process. Multipackage systems, in particular, two and three component systems are useful in molding operations, e.g., manufacture of shoe soles.

36 Claims, No Drawings

MICROCELLULAR POLYURETHANE FOAMS HAVING INTEGRAL SKIN

BACKGROUND OF THE INVENTION

This invention relates to the synthesis of polyurethane products obtained by the reaction of formulation(s) comprising polyol, polyisocyanate, and chain extender, in the presence of a flow modifier which is characterized by at least one urethane group, i.e.,

The reactants of choice such as in a two package system, e.g., the isocyanate materials in one package and the materials forming the second package, e.g., polyol(-polyester polyol or polyether polyol), chain extender, blowing agents (organic and/or H₂O), cell regulation agent, etc., which may comprise this isocyanate-curable second package, can influence the kind of polyurethane product obtained as well as its over-all properties. Thus the polyurethane product can be, for instance, a dense elastomer or an integral skin microcellular elastomer or open cellular product and the like.

Plasticizers are widely used in polymer arts such as with polyvinyl chloride, chloroprene resins, acrylics, polyvinyl butyral, nitrile rubber, polyreuthanes, cellulosic products, and others. The plasticizer should be compatible with and not "sweat out" from the plasticized resin. Desirably the plasticizer should act as a processing aid during the formation of the resin or ultimate resinous article. The plasticizer should achieve the goals which dictated its use in the first place without detracting from the properties of the unplasticized resin.

SUMMARY OF THE INVENTION

It has now been found that there can be prepared a wide variety of novel non-hydroxyl flow modifiers which are useful in the manufacture of improved polyurethane articles. It has also been found that there can be prepared novel blends comprising flow modifiers described hereinafter and polyols which are compatible liquids at room temperature or, if not initially compatible liquids, can be made so by heating and thereafter cooling to room temperature. The non-hydroxy flow modifier can be employed in NCO/OH polyaddition reactions to prepare a wide variety of polyurethane products such as adhesives, foams and elastomers. In the practice of desirable embodiments of the invention, formulations comprising flow modifier, isocyanate compound, polyol, chain extender, and other urethane-forming ingredients have been found to be extremely useful and, indeed preferred for the preparation of homogeneous and cellular polyurethane products, especially microcellular products such as, for example, integral skin microcellular polyurethanes. Such products exhibit a broad spectrum of highly desirable and/or improved characteristics. For instance, integral skin microcellular urethane articles, e.g., shoe soles, can be obtained which are characterized by a resilient core of substantially uniform density and an integrally formed, tough, substantially continuous surface skin surrounding said core, the boundary between said skin and said core being characterized by a rather abrupt change in density. The skin is itself flexible, essentially devoid of blemishes, impervious to oil and water, directly accepts paint without first requiring primers to its surface, and exhibits good flex life, high tear strength, and generally superior abrasion resistance.

Accordingly, it is an object of this invention to synthesize polyurethane products from formulations containing at least one non-hydroxyl flow modified which is characterized by at lest one urethane group, i.e.,

Another object of the invention is to provide novel compatible homogeneous liquid mixtures containing polyol and flow modifier which are isocyanate curable to improved polyurethane products, especially microcellular products including integral skin microcellular articles, flexible polyester and polyether urethane foams, and solid elastomers. A further object of the invention pertains to novel flow modifiers per se and to the proceses for their preparation. A still further object of the invention relates to single and multipackage systems in which the single package or Component (A), an isocyanate curable system, comprise the polyol and chain extender reactants and at least one flow modifier, whereas the multipackage system includes Component (A) above and Component (B) which contains a polyisocyanate reactant.

These and other objects of the invention will become apparent to those skilled in the art from a consideration of this specification.

DETAILED DESCRIPTION OF THE INVENTION

The non-hydroxyl flow modifiers which are contemplated in the preparation of polyurethane products have a boiling point above about 150° C. and are normally-liquid, i.e., liquid at about room temperature, or are relatively low melting solids which form with the polyisocyanate compounds or the polyols compatible liquid mixtures at room temperature or at the temperature of use. The flow modifier consists essentially of (a) carbon and hydrogen atoms preferably in the form of a monovalent and/or polyvalent hydrocarbon groups such as a C₁–C₁₈-acyclic group, a C₅–C₇cycloaliphatic group including the mono and poly C₁–C₄alkyl substituted counterparts thereof and/or a benzenoid ring nucleus, e.g., mono-, fused-, and bridged nuclei, including the partially or fully hydrogenated ring nuclei and the unsubstituted- and mono and poly C₁–C₄alkyl substituted-counterparts thereof; (b) etheric oxygen in the form of oxyalkylene group(s), and optionally, also in the form of alkoxy, cycloalkoxy, and aryloxy; and (c) at least one urethane group

and upwards to five such groups, preferably 2-3 such groups, each of the monovalent bonds of the urethane group being monovalently attached to separate carbon atoms of the flow modifier molecule. The term "oxyalkylene", as used herein, characterizes an oxy atom bonded to an acyclic or alicyclic carbon atom to form, as by way of illustrations, the unit

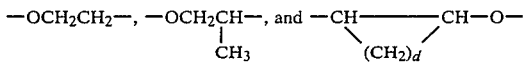

wherein d is an integer of from 3 to 6. Illustrative divalent oxyalkylene groups include oxyethylene, oxypropylene, oxytrimethylene, oxytetramethylene, chloromethyl-substituted oxyethylene, phenyl-substituted oxyethylene, dimethyl-substituted oxyethylene, cyclohexyleneoxy cyclopentyleneoxy, and methyl-substituted cyclohexyleneoxy; the mixed oxyalkylenes of the above such as oxyethyleneoxypropylene, oxyethyleneoxybutylene, and oxypropyleneoxybutylene; mixed oxyalkylenes which contain minor amounts of oxymethylene groups and the random and block oxyalkylenes of the foregoing; and the like. The flow modifiers contemplated in the practice of various embodiments of the invention are characterized by at least one oxyalkylene group and upwards to 25, and more, of such groups per urethane group, as shown in Formula I infra. The terminal oxyalkylene group is "capped" by a monovalent hydrocarbon group such as a $C_1$-$C_{17}$acyclic hydrocarbon group, desirably a $C_1$-$C_8$alkyl group. In various embodiments of the invention a suitable upper limit is eight oxyalkylene groups. Preferred flow modifiers are characterized by oxyethylene or oxypropylene group(s) or mixtures of such groups with/without minor amounts of other oxyalkylene group(s).

The average molecular weight of the flow modifiers which are employed in the preparation of the novel polyurethane products can vary over a wide range, e.g., from about 100 to a few thousand, e.g., approximately 3000. The flow modifier, as noted previously, is a normally-liquid material or a relatively low melting solid, and forms a compatible liquid with the polyisocyanate reactant and/or polyol reactant at room temperature or at the temperature of use (in the formation of polyurethane products). In general, however, many flow modifiers suitable in the practice of the invention have molecular weights in the range of from about 135 to about 1000, desirably from about 150 to about 750. The flow modifiers are characterized by the absence of groups which are normally reactive with an isocyanato group (—NCO) at typical storage and shipping temperatures such as hydroxyl, carboxyl, thiol, primary amino, secondary amino, and the like.

In one embodiment flow modifiers which are particularly suitable in the practice of the invention(s) are shown structurally in Formula I infra.

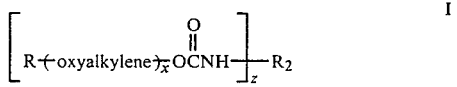

wherein the oxyalkylene group generally contains from 2 to 4 carbon atoms in the oxyalkylene chain; wherein each R individually represents a monovalent acyclic, alicyclic or aromatic group; wherein x is at least one and upwards to 25, and more, but generally 1 to 8; wherein z is from 1 to 5, preferably 2 to 3; and wherein $R_2$ represents a monovalent acyclic, alicyclic or aromatic group when z is 1 or a polyvalent acyclic, alicyclic or aromatic group when z is 2 to 5, the valence of $R_2$ being equal to the value of z. The maximum average number of $oxyC_2$-$C_3$alkylene units in the flow modifier of choice is realistically governed by the restriction that the flow modifier employed in the practice of the invention is a liquid or a relatively low melting solid which at room temperature or at the temperature of use forms a compatible stable liquid with the polyisocyanate and/or polyol reactant(s). Illustrative R groups include straight and branched alkyls, aralkyls, cycloalkyls, and the aryls (mono-, fused-, and bridged-aryls, and the partially hydrogenated aryls) such as methyl, ethyl, n-butyl, isobutyl, 2-ethylhexyl, lauryl, stearyl, oleyl, phenethyl, phenylpropyl, phenyl, tolyl, xylyl, benzyl, cyclopentyl, methylcyclohexyl, cyclohexyl, cyclohexylmethyl, cycloheptyl, and cyclohexenyl. Illustrative $R_2$ groups include alkyl, cycloalkyl, and the aryls illustrated previously as well as the corresponding higher polyvalent acyclic, alicyclic and aromatic groups, e.g., alkylene, cycloalkylene, arylene, and the like. Examples of $R_2$ groups include methyl, ethyl, n-butyl, phenethyl, 3-methoxyhexyl, xylyl, phenyl, mesityl, tolyl, indenyl, 2-methoxyphenyl, 4-biphenylyl, naphthyl, cyclohexyl, cyclopentyl, methylcyclohexyl, cycloheptyl, 1,4-butylene, 1,6-hexamethylene, cyclopentylene, cyclohexylene, cyclohexenylene, phenylene, 1,5-naphthylene, 1-methoxy-2,4-phenylene, 1-chloro-2,4-phenylene, hexahydronaphthylene, 4,4'-dicyclohexylenemethane, 1-propoxy-2,4-phenylene, xylylene, and tolylene. It is preferred that the foregoing acyclic groups contain no more than 17 carbon atoms (most preferably, no more than 10 carbon atoms), that the alicyclic groups contain from 5 to 7 carbon atoms in the ring nucleus and up to 2 carbon atoms in any substituent bonded to the ring nucleus, and that the aromatic groups contain up to 12 carbon atoms and one or two benzenoid nucleus, and that z equals 2.

A particularly preferred subclass of flow modifiers is shown in Formula IA below:

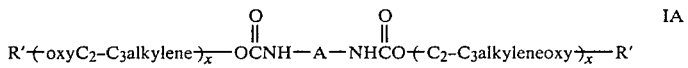

wherein each R' individually is $C_1$-$C_8$alkyl, $C_5$-$C_7$cycloalkyl, methyl- or ethyl-substituted $C_5$-$C_7$cycloalkyl, or aryl-$C_1$-$C_3$alkyl; wherein A represents $C_1$-$C_8$alkylene, cyclohexylene, $C_1$-$C_2$alkyl- or $C_1$-$C_2$alkoxy-substituted cyclohexylene, unsubstituted, $C_1$-$C_3$alkyl-, or $C_1$-$C_3$alkoxy-substituted phenylene (preferably tolylene), or divalent (4,4'- and 4,4'-/4,2'-)diphenylenemethane, or the divalent hydrogenated counterparts of the foregoing; wherein x is at least one and upwards to 25, and more, preferably 1 to 4; and wherein the $oxyC_2$-$C_3$alkylene unit is oxyethylene, oxypropylene, and mixed and/or block oxyethyleneoxypropylene unit(s), and mixtures of the foregoing.

The flow modifiers of Formulas I and IA are readily prepared by reacting monohydroxyl-terminated oxyalkylene compounds, e.g., R-(oxyalkylene)$_x$OH, with organic mono- or polyisocyanate compounds using an amount of the monohydroxyl compound sufficient to react with all the NCO groups present in the isocyanate compound. The monohydroxyl-terminated oxyalkylene compounds can be prepared by reacting a monofunctional initiator which contains an active hydrogen atom with an epoxide compound, the preferred initiator being a monohydric alcohol or a phenol and the preferred epoxide compound being the alkylene oxides such as ethylene oxide, propylene oxide, and mixtures thereof, in the presence of a base catalyst. Prior to reacting the resulting monohydroxyl-terminated polyether product with the isocyanate, it is preferred to remove the basic catalyst. These reactions are well documented in the art.

Illustrative mono- and polyisocyanates which can be employed in the OH/NCO reaction to form the flow modifiers of Formulas I and IA include aliphatic, alicyclic and aromatic isocyanates, such as phenyl isocyanate, the alkyl isocyanates such as butyl isocyanate; the polymethylene diisocyanates such as hexamethylene diisocyanate; and the aromatic diisocyanates such as 2,4-/2,6-isomers of tolylene diisocyanate, 4,4'-diphenylmethane diisocyanate, 4,4'-dicyclohexylmethane diisocyanate. Others are described, for example, in the text by W. Siefken and Justus Liebigs Annalen der Chemie, 562, pages 75 to 136.

In another embodiment flow modifiers which can be employed are depicted in Formula II infra:

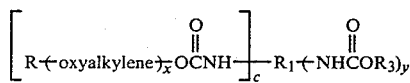

wherein R, x and oxyalkylene have the meanings or values assigned in Formula I supra, wherein $R_1$ is a polyvalent (generally a di-, tri- or tetravalent) acyclic, alicyclic, or aromatic group having the broad and preferred meanings assigned to polyvalent $R_2$ of Formula I supra, the valence of $R_1$ being equal to c plus y, wherein each $R_3$ individually is an acyclic, alicyclic or aromatic group, e.g., straight and branched alkyl, cycloalkyl, aryl, etc., as illustrated in Formula I with respect to the R group, wherein y has a value of 1 to 2, preferably one, and wherein c has a value of 1 to 2.

A preferred subclass of flow modifiers within the scope of Formula II are shown structurally in Formula IIA below:

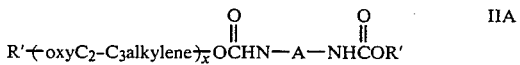

wherein R', A, x and $oxyC_2$–$C_3$alkylene have the meanings or values assigned in Formula IA supra.

The flow modifiers of Formulas II and IIA can be prepared by reacting monohydroxyl-terminated oxyalkylene compounds, e.g., R (oxyalkylene)$_x$OH, with an organic polyisocyanate having 2 to 4 —NCO groups, preferably 2 to 3 —NCO groups, such as those illustrated previously, at a 1:1 molar ratio of polyisocyanate to monohydroxyl compound, to form

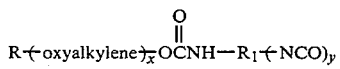

which in turn is reacted with an excess of a monohydric alcohol or a phenol, or an admixture of same with R (oxyalkylene)$_x$OH, to form the products of Formula II supra. Excess monohydric or phenolic compound can be removed via distillation or other means known to the art.

Accordingly, various aspects of the invention are to provide novel formulations and novel processes to prepare highly useful and improved polyurethane products. Such formulations comprise polyol, chain extenders, organic polyisocyanates, and at least one flow modifier. The invention contemplates the "one shot" process and the stepwise or prepolymer processes, including the total prepolymer process and the "quasi-prepolymer" process, wherein only a portion of the polyol is reacted stepwise with the polyisocyanate. The quasi-prepolymer process is the most suitable and preferred in the production of improved microcellular products contemplated by the invention. The one-shot process is the preferred process in the manufacture of flexible polyester and polyether polyurethane foams. For the preparation of solid elastomers, the prepolymer process is normally preferred. In this case it is highly preferable to combine the chain extender with the flow modifier as a separate stream. Improved cellular polyurethane products, especially microcellular products including integral skin microcellular articles and flexible foams, can be obtained by using blowing agents as well as other known polyurethane-forming or polyurethane-aiding ingredients, as desired.

Among the polyisocyanates suitable in the preparation of such useful polyurethane products include the acyclic, alicyclic and aromatic polyisocyanates, mixtures of these polyisocyanates and their carbodiimide derivatives, and in particular polyester and polyether prepolymers of these polyisocyanates. Mixtures of these prepolymers with diisocyanates per se and with their carbodiimides are also contemplated. Illustrative of the diisocyanates include 1,4-tetramethylene diisocyanate, 1,6-hexamethylene diisocyanate, isophorone diisocyanate the urea derivative of this isocyanate [OCN(CN$_2$)$_6$NHCONH(CH$_2$)$_6$NCO], cis and trans isomers of methylene bis-(cyclohexyl isocyanate), 4,4'-benzidine diisocyanate, 3,3'-dimethyl-4,4'-benzidine diisocyanate, p-phenylene diisocyanate, 2,4/2,6-isomers of tolylene di-isocyanate, 1,5-naphthylene diisocyanate, 4,4'-diphenylmethane diisocyanate, 4,4'-diphenylmethane diisocyanate containing up to 25%, or more, of the 2,4'-and 2,2'-isomer, a liquid mixture of 4,4'-diphenylmethane diisocyanate and carbodiimides thereof, for example, Isonate 143-L (available from The Upjohn Company; U.S. Pat. No. 3,492,330), and mixtures of the above. The methods for the preparation of the above-described polyisocyanates and a more comprehensive listing of polyisocyanates is presented by W. Siefken, in Justus Liebigs Annalen der Chemie, Volume 562, Pages 75-136 which is incorporated by reference into this application as if set out in full text herein.

Isocyanato-terminated prepolymers suitable in the practice of the invention are prepared by reacting a polyester polyol or polyether polyol described hereinafter with a polyisocyanate compound, e.g., acyclic, alicyclic and aromatic polyisocyanates. Especially suitable polyisocyanates for this purpose include mixtures of 2,4- and 2,6-tolylene diisocyanates, and polyisocyanate compounds characterized by methylene groups (—CH$_2$—), each valence of which is separately bonded to a carbon atom of a benzenoid nucleus such as a diphenylmethane diisocyanate (MDI), for example, 4,4'-diphenylmethane diisocyanate, 2,4'-diphenylmethane diisocyanate, mixtures of 4,4'-MDI and 2,4'-MDI, a liquid mixture of 4,4'-MDI and carbodiimides thereof, e.g., Isonate 143-L, mixtures of 4,4'-MDI and minor amount of the 2,4'- and 2,2'-MDI isomers, and the like. The isocyanate compound and polyol are reacted in a ratio of NCO groups to OH group of at least about 2.5:1, but a more suitable range of NCO equivalents per OH equivalent is from about 2.7 to about 24 (NCO) to one (OH). A NCO/OH ratio in the range of from about 3.7:1 to about 12:1 is preferred with a most preferred ratio being from about 7 to about 12 NCO equivalents per one OH equivalent.

Polyols useful in the preparation of a wide variety of polyurethane products have molecular weights in the range of from about 1800 to about 10,000 and preferably in the range from 2000 to 5000. Polyethers containing at least 2 and preferably 2 to 3 hydroxyl groups are suitable for use in the invention, are known, and are obtained, for example, by the polymerization of epoxides, such as ethylene oxide, propylene oxide, butylene oxide, tetrahydrofuran, styrene oxide or epichlorohydrin alone, for example in the presence of $BF_3$, or by the chemical addition of these epoxides, optionally in admixture with or in succession to starter components having reactive hydrogen atoms. Such starter compounds include water, alcohols, or amines, such as ethylene glycol, 1,3- or 1,2-propylene glycol, trimethylolpropane, 4,4'-dihydroxydiphenylpropane, aniline, ammonia, ethanolamine and ethylenediamine. In many cases, it is preferred to use polyethers of the kind which contain predominant amounts of primary hydroxyl (—OH) groups (up to 90% by weight, based on all the hydroxy groups present in the polyether). Polyethers modified by vinyl polymers of the type obtained by the polymerization of styrene and/or acrylonitrile in the presence of polyethers (U.S. Pat. Nos. 3,383,351; 3,304,273; 3,523,093; 3,110,695; German Pat. No. 1,152,536) are also suitable, as are polybutadienes containing hydroxyl groups.

Polyesters, polythioethers, polyacetals, polycarbonates, and polyesteramides containing hydroxyl groups of the type commonly used for the production of homogeneous and cellular polyurethanes, may also be used in appropriate proportions. Examples of suitable polyesters containing hydroxyl groups are reaction products of polyhydric (preferably dihydric and, optionally, trihydric) alcohols with polybasic (preferably dibasic carboxylic acids). Instead of free polycarboxylic acids, the corresponding polycarboxylic acid anhydrides or corresponding polycarboxylic acid esters of lower alcohols or mixtures thereof may also be used for the production of the polyesters. The polycarboxylic acids may be aliphatic, cycloaliphatic, aromatic and/or heterocyclic, and may optionally be substituted, for example, by halogen atoms, and/or may be unsaturated. These polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric cid anhydride, maleic acid, maleic acid anhydride, fumaric acid, dimeric and trimeric fatty acids such as oleic acid, optionally in admixture with monomeric fatty acids, terephthalic acid dimethyl ester and terephthalic acid-bisglycol ester. Suitable polyhydric alcohols include ethylene glycol, 1,2- and 1,3-propylene glycol, 1,4- and 2,3-butylene glycol, 1,6-hexanediol, 1,8-octanediol, neopentyl glycol, cyclohexanedimethanol (1,4-bis-hydroxymethylcyclohexane), 2-methyl-1,3-propanediol, glycerol, trimethylolpropane, 1,2,6-hexanetriol, 1,2,4-butanetriol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones such as ε-caprolactone or hydroxycarboxylic acids such as ε-hydroxycaproic acid, may also be used.

Particular examples of polythioethers are the condensation products of thiodiglycol with itself and/or with other glycols, dicarboxylic acids, formaldehyde, aminocarboxylic acids or amino alcohols. Depending upon the co-components, these products are polythio mixed ethers, polythioether esters or polythioether ester amides.

Suitable polyacetals include those compounds which can be obtained from glycols, such as diethylene glycol, triethylene glycol, 4,4'-dioxethoxydiphenyldimethylmethane, hexanediol and formaldehyde. Other suitable polyacetals may be obtained by polymerizing cyclic acetals.

Suitable polycarbonates containing hydroxyl groups are those known per se. They are obtained for example, by reacting diols such as 1,4-propanediol, 1,4-butanediol and/or 1,6-hexanediol, diethylene glycol, triethylene glycol, tetraethylene glycol; with diaryl carbonates such as diphenyl carbonate or phosgene.

Examples of the polyester amides and polyamides are the predominantly linear condensates obtained from polyhydric saturated and unsaturated amino alcohols, diamines, polyamines, and mixtures thereof.

Examples of these compounds are known and are described in High Polymers, Vol. XVI, "Polyurethanes, Chemistry and Technology:, by Saunders-Frisch, Interscience Publishers, New York-London, Vol. I (1962), pages 32–42 and pages 44–54, and Vol. II (1964), pages 5–6 and pages 198–199 and in Kunststoff-Handbuch, Vol. III, Vieweg-Hochtlen, Carl-Hanser-Verlag, Munich (1966) on pages 45–71.

The flow modifiers may also be admixed with a wide variety of polyols illustrated herein with/without other ingredients normally used in the formation of polyurethane products to form novel compatible liquid blends at room temperature or at the temperature of use. Accordingly, desirable aspects of the invention are directed to such novel blends in which there can be included the flow modifier in the "polyol resin" side, e.g., polyol, chain extender, with/without blowing agent, and other typical urethane ingredients. Flow modifiers of the present invention which perform well in the manufacture of polyurethane articles, especially in the manufacture of microcellular parts such as normal polyurethane shoe soles or integral skin shoe soles having a lower density microcellular core, flexible polyether and polyester polyurethane foams possessing the ability to conduct static electricity, and solid polyurethane elastomers characterized by relatively low hardness and high coefficient of friction, have generally been observed to form soluble, compatible homogeneous liquid mixtures with the polyol or with polyol/chain extender blends. Such chain extenders are illustrated by glycols, amino alcohols, diamines and water, as well as mixtures of these extenders. In general, the flow modifiers can decrease the viscosity of the polyol reactant mixture, a highly desirable aspect for low temperature processing on polyurethane machinery. Their inclusion with the urethane-forming ingredients also improves the flow of materials, slows down the gel-formation of the polymer, thus bringing about capability to obtain exacting molded products, e.g., shoe soles, vehicle tires, integral-skin parts for automotive applications such as arm rests, instrument panels, and the like, from mold cavities of intricate pattern and design.

When the flow modifier is included with the polyether or polyester polyol, or polyol-extender blend, to form compatible homogeneous liquid mixtures, the concentration of the flow modifiers can be in the range of from about 5 parts to as high as 50 parts and higher of flow modifier per 100 parts of polyol. The amount of flow modifier utilized is generally dictated, among other considerations, by its upper limit of compatibility with the resulting polyurethane product. Such compatibility depends upon many variables such as composition of the polyol backbone, the nature of the polyisocyanate and chain extender, and of course upon the chemical composition of the flow modifier contemplated in the present invention. By way of illustrations, for the manufacture of microcellular polyurethane products including integral skin microcellular elastomers for use such as shoe soles, suitable proportions of flow modifier generally range from about 5 to 35 parts, desirably from about 10 to 30 parts, per 100 parts of polyol. In the manufacture of foams having the capability to conduct static electricity, flow modifier levels of from about 20 to 50 parts per 100 parts of polyol are generally suitable. In the manufacture of soft elastomers (microcellular and/or solid), e.g., approximately 50 to 60 Shore A hardness, exhibiting improved coefficient of friction, the use of about 5 to 20 parts of flow modifier per 100 parts of polyol is generally desirable. One or more than one flow modifier can be employed in the practice of the inventions.

Chain extenders which are especially useful in the invention are the glycols, amino alcohols, diamines and water. Typical glycols are illustrated by the alkanediols of the formula $HO-(CH_2)_n-OH$, wherein n is 2 to 10 or more, e.g., ethylene glycol, 1,3-propanediol, 1,4-butanediol, 1,5-pentanediol, 1,6-hexanediol, 1,10-decanediol, and the like. Other glycols that are suitable include diethylene glycol, thiodiglycol, triethylene glycol, tetraethylene glycol, p-xylylenediol, quinitol, neopentylene glycol, dihydroxyethylhydroquinone, and mixtures thereof, and the like. It is also possible to use glycols characterized by hetero atoms such as nitrogen and/or sulfur; double bonds; and bromine or other halogen atoms. These include N-methyldiethanolamine, N-t-butyldiethanolamine, di-beta-hydroxyethylaniline, triethanolamine, triisopropanolamine, di-beta-hydroxyethyl sulfide, 2-butene-1,4-diol, 2,3-dibromo-1,4-butanediol, di-beta-hydroxyethylurea, and di-beta-hydroxyethyl urethane.

Suitable triol chain extenders further include glycerol, trimethylolpropane, 1,2,6-hexanetriol, and the like. Short chain glycol extenders such as ethylene glycol, 1,4-butanediol, 1,6-hexanediol, di-beta-hydroxyethylaniline and mixtures thereof are preferred.

Suitable amino alcohol and polyamine chain extenders include ethanolamine, p-hydroxyethylaniline, ethylenediamine, 1,6-hexanediamine, 4,4'-diphenylmethane diamine, methylene-bis-(o-chloroaniline), 3,3'-dichloro-4,4'-benzidine, perethylated 2,4- and 2,6-tolylenediamines, 1,4-cyclohexylenediamine, m-xylylenediamine, piperazine, hydrazine, N,N'-dimethylhydrazine, diethylenetriamine, and the like.

For the manufacture of foams, water and polycarboxylic acids, and the like may be used as chain extenders. For flexible polyurethane foams, water is highly preferred.

Cellular products, in particular, microcellular products including integral skin microcellular polyurethanes can be prepared by using well-known blowing agents. The choice of the blowing agent(s) is significantly influenced by the polyol reactant employed and the type of cellular polyurethane product desired. Thus, the use of water as the blowing agent in a formulation containing a polyether polyol and prepolymer (from polyether polyol and MDI) in the presence of the flow modifier will yield an open cell foamed product whereas the use of an organic blowing agent with/without a small amount of water in a formulation comprising polyester polyol, glycol chain extender, and prepolymer (derived from polyester polyol and MDI) in the presence of the flow modifier, in a closed mold system, results in an improved integral skin microcellular polyurethane product. Illustrative blowing agents include water, the halogenated hydrocarbons, in particular fluorocarbons such as trichlorofluoromethane, 1,1-difluoro-1-chloro-2-fluoro-2-dichloro-ethane, difluorodichloromethane, and mixtures of the same and the like halogenated hydrocarbons. It is also feasible to use mixtures of low boiling hydrocarbons, ethers, and ketones with halogenated hydrocarbons. Additional blowing agents are well known in the art.

Flexible polyurethane foams exhibiting the capability to conduct static electricity can be prepared by employing flow modifiers described in the present invention that contain a high amount of oxyethylene units. Suitable flow modifiers contain at least about 50%, by weight, of oxyethylene units in the polyether chain, preferably about 75%, by weight of oxyethylene units, and highly preferably about 85%, by weight, or more of such oxyethylene units, in the polyether chain of said flow modifier. Such polyurethane foams can, for example, be prepared from suitable branched polyether polyols, water as the blowing agent and chain extender, and the commercially known 80:20 isomeric mixture of 2,4- and 2,6-tolylene diisocyanate. Typical flow modifier concentrations in the polyurethane foam can vary from about 15–40 weight %, based on the weight of the polyurethane foam, preferably from about 20–30% by weight. Antistatic modifiers of this type can also be used in microcellular elastomers for shoe soles and the like. Such products have excellent utility as carpet underlayments for computer rooms, or for footwear applications where static electricity presents a hazard or other problem.

The flow modifiers of the present invention are eminently suitable for the manufacture of polyurethane elastomers of relatively low hardness, for example, from 50–65 Shore A. These hardness ranges can be attained at flow modifier levels of from about 5–15% by weight, based upon the combined ingredients employed in the preparation of said polyurethane elastomers. These products have the capability to approach the friction properties of natural and synthetic rubbers, and lend themselves to use as skid-resistant footwear products having outstanding toughness, durability, and wear resistance, while exhibiting outstanding flexibility at low temperatures.

Catalysts which are employed for the purpose of accelerating the well-known NCO/active hydrogen chemical reactions include tertiary amines, metallic catalysts and combinations thereof. Typical amine catalysts include tertiary amines, such as triethylamine, tributylamine, N-methylmorpholine, N-ethylmorpholine, N-cocomorpholine, N,N,N',N'-tetramethylethylenediamine, 1,4-diazabicyclo[2.2.2]octane, N-methyl-N'-dimethylaminoethylpiperazine, N,N-dimethylbenzylamine, bis-(N,N-diethylaminoethyl)adipate, N,N-diethylbenzylamine, pentamethyldiethylenetriamine, N,N-dimethylcyclohexylamine, N,N,N'-N'-tetramethyl-1,3-butanediamine, N,N-dimethyl-beta-phenylethylamine, 1,2-dimethylimidazole and 2-methylimidazole. Other suitable catalysts are known Mannich bases of secondary amines such as dimethylamine, and aldehydes, preferably formaldehyde; or ketones such as acetone, methyl ethyl ketone, and cyclohexanone; or the phenols such as phenol, nonylphenol and bisphenol.

Tertiary amines containing isocyanate-reactive hydrogen atoms may also be used as catalysts and include triethanolamine, triisopropanolamine, N-methyldiethanolamine, N-ethyldiethanolamine, N,N-dimethylethanolamine, also their reaction products with alkylene oxides such as propylene oxide and/or ethylene oxide.

Other suitable catalysts are sila-amines with carbon-silicon bonds of the type described, for example, in U.S. Pat. No. 3,620,984. Specific examples include 2,2,4-trimethyl-2-silamorpholine and 1,3-diethylaminomethyltetramethyldisiloxane.

It is also possible to use as catalysts nitrogen-containing bases, such as tetraalkylammonium hydroxides; alkali metal hydroxides such as sodium phenolate; or alkali metal alcoholates such as sodium methylate. Hexahydrotriazines may also be used as catalysts.

Organotin compounds and organomercury compounds may also be used as catalysts. Preferred organotin compounds include tin (II) salts of carboxylic acids, such as tin (II) acetate, tin (II) octoate, tin (II) ethylhexoate and tin (II) laurate, and tin (IV) compounds such as dibutyltin oxide, dibutyltin dichloride, dibutyltin diacetate, dibutyl dilaurate, dibutyltin maleate or dioctyltin diacetate. It is of course possible to use any of the above-mentioned catalysts in the form of mixtures. Organic mercury catalysts are described in U.S. Pat. No. 3,642,044.

Further representatives of catalysts suitable for use in accordance with the invention and information on the way in which these catalysts work, may be found in Kunststoff-Handbuch, Vol. VII, by Vieweg and Hochtlen, Carl-Hanser-Verlag, Munich 1966, for example, on pages 96 to 102.

The catalyst can be employed in catalytically significant quantities, for example, from about 0.01 to about 1 percent by weight, based on the curable formulation.

Further ingredients which may be used depending, of course, on the formulation to be employed and the product desired, include surface active additives such as emulsifiers and foam stabilizers. Examples of suitable emulsifiers include the sodium salts of castor oil sulphonates or salts of fatty acids with amines, such as diethylamine oleate or diethanolamine stearate. Alkali metal or ammonium salts of sulphonic acids, for example, of dodecylbenzenesulphonic acid or dinaphthylmethanedisulphonic acid, or of fatty acids, such as ricinoleic acid or of polymeric fatty acids, may also be used as surface-active additives.

Suitable foam stabilizers include polyether siloxanes, especially those which are water-soluble. These compounds are generally synthesized in such a way that a copolymer of ethylene oxide and propylene oxide is attached to a polydimethylsiloxane radical. Foam stabilizers of this type are described, for example, in U.S. Pat. Nos. 2,834,748; 2,917,480; and 2,629,308.

Further ingredients which are very useful especially in the preparation of microcellular elastomers including the integral skin type are cell regulating agents such as polydimethylsiloxanes having viscosities of from about 2 to about 100 centistokes at 25° C., preferably from about 2 to about 50 centistokes at 25° C.; polyphenylmethylsiloxanes like the products described in U.S. Pat. No. 4,042,537; mineral oils; polyether polyols comprising copolymers and block copolymers of ethylene and propylene oxides; and the like. Such polyether polyols can be linear or branched copolymers and block copolymers having molecular weights of, for example, from 1000 or lower to 6000 or higher. The preferred polyether polyols are linear copolymers and block copolymers having molecular weights of from about 2000 to about 3500. They can be utilized in proportions from 1 to as high as 20 parts per 100 parts of the polyol, preferably polyester polyols such as described above. These polyether polyols can also be advantageously used with the silicone fluids described below in various proportions in an effective amount to control the cell size as described herein.

Highly preferred cell regulating agents are the polydimethylsiloxanes having viscosities of from about 2 to about 20 centistokes at 25° C. Examples of these products include DC 200 fluids (available from Dow Corning Corporation), having viscosities of from about 5 to about 100 centistokes at 25° C., and also Dow Corning Fluid DCF-1-1630, having a viscosity of about 3.5 centistokes at 25° C. (the viscosity being an indicator of the molecular weight of these silicon fluids). DC 200 fluid 5 cs has a molecular weight of 680, 10 cs oil corresponds to 1000, 20 cs to 1600, 50 cs to 3200, and 100 cs to 5000 molecular weight.

When utilizing the present invention(s) for making shoe soles, either of two commonly employed sole making processes are satisfactory. In one process, the left and right foot soles are cast as plaques, removed from the cast, and then attached to the shoe uppers by a suitable adhesive. In the other process, the shoe uppers, i.e., left and right foot, are presented as one mold surface and the resin is cast in the mold cavity defined by the shoe uppers and the mold walls. In either case, the molds are closed wall molds so as to obtain the mold defined sole shape. This sole shape may not necessarily be smooth (although it is typically so), but may have build in mold ridges such as for resiliency, cushioning, etc.

In either process, the typical adhesives (also called "cements") for attaching (also called "cementing") the soles to the uppers are well known. In the second process, i.e., the direct attachment, the adhesive may be the cast polyurethane minus the blowing agent which is cured with the cast foam as it cures, or it may be a different polyurethane adhesive.

In making the shoe soles, typically the curable formulation is in a prepackaged form with the isocyanate and prepolymer thereof as one package and the polyol, chain extender, and other additives as another. Among the additives, the presently disclosed flow modifiers are included. A further package may contain the catalyst and the cell control agents such as in a three package system.

Thus, for selling to shoe manufacturers, the mixing of the material is done on the premises shortly prior to casting, but the packages are purchased typically in a separate form in proportion suitable for practice of the invention, i.e., for making the shoe soles as well as for obtaining the final product. Consequently, an aspect of the invention includes the "kit" form or "package" form combinations of the components. Hence, package (A) or Component (A) containing polyol and flow modifier as a compatible homogeneous liquid, by itself is believed to be novel as is its combination with/without additional ingredients such as glycol chain extender, blowing agent, cell regulating agent, catalyst, etc. Moreover, the "multi-package" or "kit" form is considered to be novel in that one package (A) comprises polyol and flow modifier with/without additional ingredients mentioned above and a second package (B) contains the polyisocyanate, especially as a quasi-prepolymer obtained by reacting all the isocyanate component with a predetermined partial quantity of the polyol component in amounts sufficient to result in quasi-prepolymers having NCO/OH ratios of the order stated previously.

Several advantages result by using the flow modifiers contemplated herein in polyether polyol systems. Generally, the polyether polyurethane products exhibit improved low temperature characteristics, e.g., resistance to cut tear at extremely low temperatures (−30° C.). The elongation characteristic is increased, a property which is particularly useful when the polyurethane product is considered for sealant and adhesive applications. A higher coefficient of friction characteristic is obtained in the flow modified systems. This property is highly desirable in, for example, tire tread applications. The inclusion of the flow modifier in the isocyanate curable "resin package", e.g., polyol, glycol chain extender with/without other ingredients, enhances its solubility and compatibility and serves to act in a manner similar to a "coupling agent" in effecting a more uniform polyaddition reaction between the OH groups of the resin package with the NCO group of the isocyanate package.

The flow-modified polyester polyurethane products, in general, exhibit many of the foregoing advantages. Though improvement in the low temperature property is noticed, this improvement is seen at a relatively higher temperature, e.g., −20° C. The flow modifiers are, in general, excellent viscosity reducers for polyester polyol systems. Additionally, the

group(s) of the flow modifier is believed to further enhance the solubility and compatibility of polyester polyol systems. This particular property, i.e., viscosity reducer, is not of particular importance in polyether polyol formulations since commercial polyether polyols are generally low viscosity products.

In the practice of highly desirable embodiments of the invention, the flow-modified polyester polyol systems are particularly useful in the manufacture of high performance microcellular polyurethane elastomer products, in particular shoe soles. The characteristics and properties of preferred polyester products of the invention are detailed in U.S. Pat. No. 4,287,307, issued Sept. 1, 1981, and for sake of completeness are summarized hereinbelow. The microcellular polyester elastomers have cell diameters in the range of from 0.3 to 0.01 mm, or less, with a minimum density of 160 kg/m$^3$ (10 lbs/ft.$^3$). A broad density range is from 160 to 900 kg/m$^3$, corresponding to a specific gravity of from 0.06 to 0.09 gm/cm$^3$; a preferred range is from 350 to 700 kg/m$^3$, corresponding to a specific gravity from 0.35 to 0.7 gm/cm$^3$. The foam portion of the microcellular polyester polyurethane elstomer comprises a blown cell structure that has a minimum number of about 30–40 cells/cm to 1,000 cells/cm, or more. A preferred range is from 50 cells/cm to 1,000 cells/cm.

The surface skin of integral skin microcellular polyester polyurethane products obtained by the practice of the present invention generally has a thickness of 0.5 to 4 mm, or more, preferably from 1–3 mm. The flex life, as measured by the Ross flex test (ASTM D-1052), or the de Mattia flex test (ASTM D-430), has been found to be extremely good, in comparison with microcellular polyurethane elastomers which result from formulations employing water as the blowing agent (such products having no clearly defined integral-skin surface). The tear strength of these integral-skin microcellular polyester polyurethane elstomer products, when measured according to ASTM D-625, as well as the abrasion resistance, when measured according to the Taber abrasion (ASTM D-3389), are also appreciably bettern in comparison with products prepared by blowing with carbon dioxide (water-isocyanate rection).

Further advantages and properties of the microcellular polyester polyurethane elastomer products obtained by the practice of preferred aspects of the invention are disclosed in said U.S. Pat. No. 4,287,307 and such disclosure is incorporated into this specification as if set forth in detail herein.

Several advantages result by utilizing the flow modifiers contemplated herein in polyether and polyester systems used in the manufacture of flexible polyurethane foams. As described hereinabove, the use of flow modifiers containing a high oxyethylene content can result in polyurethane foams that are capable of dissipating static electricity efficiently from carpets when used in underlayments, or from foamed footwear worn by personnel in computer rooms.

The flow modifiers of the present invention also have the capability to render flexible polyurethane foams hydrophilic. Normal (conventional) low density polyurethane foams are normally prepared from hydrophobic polyethers or polyesters and aromatic isocyanates. The flow modifiers of the present invention have the unique capability of imparting to the polyurethane foam the characteristic to pick up substantial quantities of water without leaching the modifier out of the polyurethane foam. This is believed to be partially due to the fact that reactive urethane hydrogen atoms in the flow modifier have the capability to react with a portion of the isocyanate groups of the foam ingredients, rendering the foam surface highly hydrophilic. These foams, both of the polyester and polyether type, are particularly interesting as household sponges, sponges for car washing, hydrophilic plant growing medium sponges, and the like. If desired, the polyurethane foam can be made by incorporating, in addition to the flow modifier, soaps, detergents, shampoos, fertilizers, plant growth hormones, enzymes, and the like.

In the manufacture of solid polyurethane elastomers via the prepolymer process (a route that is oftentimes preferred) the flow modifiers of the present invention can be employed to act as convenient solvents for the glycol and/or amine chain extender. Polyurethane elastomers are often prepared at prepolymer:extender ratios of 100:10 or less. Such dissimilar ratios are difficult to meter. Moreover, the extender is often quite insoluble in the prepolymer. The flow modifier of the present invention oftentimes will greatly facilitate the preparation of a stable extender system that is more readily dispersed (a system oftentimes much lower melting than the pure extender), and yielding additional processing advantages such as the ability to obtain much longer pot-lives due to the lower operating temperature that can be employed. Hence, the application of compatible flow modifier-chain extender combination packages represents a further important aspect of the invention.

In addition to the apparent novel flow modifiers embraced by Formula I supra, desirably where the variable x is greater than 1 such as 2 or 3 and upwards to 8 and even 25, or more, many flow modifiers which are particularly preferred from a commercial viewpoint are shown in structural Formula III below:

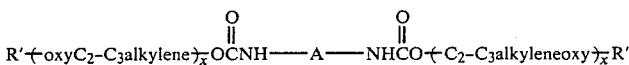

wherein each R' individually is alkyl, desirably $C_1$–$C_8$-alkyl; a $C_5$–$C_7$cycloalkyl desirably methyl- or ethyl-substituted $C_5$–$C_7$cycloalkyl, or aralkyl, desirably phenyl-$C_1$–$C_3$alkyl; wherein A represents alkylene, desirably $C_1$–$C_8$alkylene; a $C_5$–$C_7$-cycloalkylene, desirably cyclohexylene, $C_1$–$C_2$alkyl- or $C_1$–$C_2$alkoxy-substituted cyclohexylene; $C_1$–$C_4$-cyclohexylenealkylene such as isopropylcyclohexylenemethylene; unsubstituted, $C_1$–$C_3$alkyl-, or $C_1$–$C_3$alkoxy substituted phenylene (preferably tolylene), or divalent (4,4'- and 4,4'-/4,2'-)diphenylenemethane, or the divalent hydrogenated counterparts of the foregoing; wherein x is at least one and upwards to 25, and more, preferably 1 or 2 and upwards to 8, more preferably 1 to 4 or 2 to 4; and wherein the oxy$C_2$–$C_3$alkylene unit is oxyethylene (preferred), oxypropylene, and mixed and/or block oxyethyleneoxypropylene unit(s), and mixtures of the foregoing. When the oxy$C_2$–$C_3$alkylene unit represents oxyethyleneoxypropylene, the mol ratio of the oxypropylene moiety to the oxyethylene moiety is in the range of from abubt 75:25 to about 25:90.

A further subclass of flow modifiers which is useful in the practice of the invention(s) include the following:

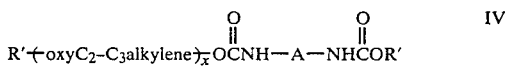

wherein R', A, x, and oxy$C_2$–$C_3$alkylene have the meaning assigned in Formula III above.

Novel flow modifiers which are especially preferred include the urethane products resulting from the reaction of 2,4- and or 2,6-toluene diisocyanate and monoether of mono- and of poly$C_2$–$C_3$alkylene glycol of the formula

wherein R' is alkyl or aryl, preferably methyl, ethyl, propyl, isopropyl, butyl, isobutyl, sec-butyl, pentyl, hexyl and phenyl; wherein x is at least one, preferably 1 or 2 and upwards to 8; and wherein oxy$C_2$–$C_3$alkylene represents oxyethylene (preferred) and oxypropylene and when x is 2 or more oxy$C_2$–$C_3$alkylene can also be oxyethyleneoxypropylene, desirably where the mol ratio of the oxypropylene moiety to the oxyethylene moiety is in the range of from about 75:25 to about 25:90.

Additional novel flow modifiers which are preferred include the urethane reaction products resulting from the reaction of R'–(oxy$C_2$–$C_3$alkylene)$_x$OH, the R', x, and oxy$C_2$–$C_3$alkylene unit having the significance assigned in Formula IV supra, and a diphenylmethane diisocyanate (MDI) such as 4,4'-diphenylmethane diisocyanate, 2,4'-diphenylmethane diisocyanate, mixtures of 4,4'-MDI and carbodiimides thereof, e.g., Isonate 143-L, mixtures of 4,4'-MDI and minor amount of the 2,4'- and 2,2'-MDI isomers, and the like. The isocyanate compound and polyol are reacted in amounts to give a ratio of NCO groups to OH groups of one.

Other preferred flow modifiers are shown in Formula VI below:

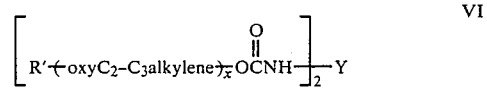

wherein Y represents 4,4'- and/or 2,4'-diphenylenemethane or $C_4$–$C_6$alkylene; and wherein R', x, and the oxy$C_2$–$C_3$alkylene unit have the meanings assigned in Formula V above.

DESCRIPTION OF TEST METHODS

The following test methods have been used to determine physical properties. The description found in the appropriate ASTM manual applies except as noted below:

Tear Strength:
  Determined in accordance with ASTM D-624. Die C.

Tensile Strength:
  Determined in Accordance with ASTM D-412. Method A.

Flex Testing:
  Determined in accordance with ASTM D-1052, except as noted below:
  Ageing was under ambient conditions for at least one week prior to testing. Preparations of sample differs from ASTM D-1052 in that a "TEXON" insole material was cemented to the specimen to increase the stress on the hole made with the piercing tool. The "TEXON" material is (available from Texon, Inc., South Hadley, MA.) 0.070 inches in thickness and must be cemented to the entire 1×6 inch surface of the specimen. The "TEXON" is cemented to the uppermost molded surface of the plaque. Cementing should be done with a heat activated urethane adhesive applied to both the "TEXON" and the specimen in accordance with the manufacturers' recommendations. Results are reported in cycles at 500% cut growth as well as % cut growth at selected number of cycles.

Hardness:
  Determined in accordance with ASTM D-2240, Durometer Shore A.

Viscosity:

Determined with a Brookfield viscometer (Brookfield Engineering Laboratories, Inc.) in accordance with ASTM D-2849.

Hand Foams:

Hand foams are prepared by weighing all the ingredients of the polyol component (i.e., the polyester polyol, the flow modifier, any extenders, surfactants and catalysts, and the blowing agents as required into a polyethylene lined paper cup. This component is then mixed well. The required amount of isocyanate is then weighed into the polyol component and mixed at high speed for 8 to 10 seconds. The mixture is then cast into a clean cup or a mold as required.

In the tables herein, the following terms of art which are being used are defined below:

Cream Time: The time interval between the final mixing and the point at which the mixture turns creamy or cloudy and starts to expand.

Rise Time: The time interval between the liquid mixture poured into the container (mold) and the completion of expansion of the foaming mass.

Tack Free Time: The time interval between pouring the liquid mixture and the time that the surface of the foam can be touched with a finger without sticking.

Snap Time: When the reacted polymer can no longer be separated when pinched between two fingers and pulled.

Free Blowing Density: The density in lbs./ft.$^3$ of a foam that is allowed to rise in an open cup and is determined by cutting the cap of the foam flush with top of the cup and using the following equation:

$$\frac{\text{weight of foam and cup} - \text{weight of cup}}{\text{cc of cup}} \times 62.43 = \text{lbs/ft}^3$$

Molded Density: The molded density is expressed in terms of grams per cubic centimeter (gm/cc.), and is measured on the molded item by means of volume displacement with a liquid.

Inasmuch as a number of components employed in the practice of the invention have been identified by their trade names, for the sake of convenience, these are tabulated herein and their chemical structure or specifications further amplified so that any of these components can be readily obtainable or made by those of ordinary skill in the art. The components are marked with a double asterisk (**) in the Examples.

| TRADE NAME DESIGNATION TABLE | |
|---|---|
| Trade Designation | Identification of Component(s) and source of same |
| ISONATE 240 Isocyanate | The Upjohn Company. A prepolymer comprising the reaction product of about 40 parts by weight of (a) a difunctional copolyester polyol of adipic acid, ethylene glycol and 1,4-butanediol having a molecular weight of about 2000, and (b) about 60 parts by weight of carbodiimide modified 4,4'-diphenylmethane diisocyanate; said pre-polymer having an isocyanate content of about 18.8% by weight, an isocyanate equivalent of about 223, and a viscosity at 30° C. of about 1000 centipoises. The product crystallizes at approximately 15° C. |
| MONDUR E-501 Isocyanate | Mobay Chemical Corporation, Polyurethane Division. A carbodiimide modified diphenylmethane diisocyanate terminated polyester pre-polymer having an isocyanate content of about 18.9% by weight, an isocyanate equivalent of about 222.5, and a viscosity at 30° C. of about 830 centipoises. |
| MONDUR MR Isocyanate | Mobay Chemical Corporation, Polyurethane Division. A crude polymethylene polyphenyl polyisocyanate having an isocyanate content of about 31.5% and an isocyanate equivalent of about 133.4. |
| ISONATE 125M Isocyanate | The Upjohn Company. A high-purity grade of diphenylmethane diisocyanate containing approximately 98% 4,4'-diphenylmethane diisocyanate and 2% 2,4'-diphenylmethane diisocyanate. The average isocyanate equivalent is 125. |
| ISONATE PF Isocyanate | Mobay Chemical Corporation, Polyurethane Division. A clear yellow liquid isocyanato-terminated polyether prepolymer made by reacting about 85 weight percent 4,4'-diphenylmethane diisocyanate and about 15 weight percent dipropylene glycol and tripropylene glycol. It has an isocyanate content of about 22.6% by weight and an isocyanate equivalent of about 186. |
| POLYESTER A | A diethylene glycol-glycerol adipate polyol having a degree of branching of about 2.35, a hydroxyl number of 42.7, an acid number of 0.4, and an equivalent weight of about 1300. |
| POLYESTER B | An ethylene glycol-1,4 butanediol glycerol adipate polyol having a functionality of about 2.3, a hydroxyl number of 40.7, a carboxyl number of 0.2, and an equivalent weight of about 1370. |
| DABCO 33LV Catalyst | Air Products & Chemicals, Inc. A liquid blend catalyst consisting of ⅓ 1,4-diazobicyclo[2.2.2]octane and ⅔ dipropylene glycol. |
| L-5340 Surfactant | Union Carbide Corporation. A non-hydrolyzable polyoxyethylenepolydimethylsiloxane surfactant: Viscosity 25° C., Centistokes 130, Flash Point ° F., Closed Cup 160; Apparent Specific Gravity 25°/25° C. 1.05. |
| SILICONE A | A dimethylpolysiloxane silicone fluid having a viscosity of 3.5 centistokes at 25° C. |
| SYNCAT M 601 Catalyst | Plas-Tech Systems, Inc. A dialkyltin catalyst in a plasticizer. |
| FREON 113 Blowing Agent | E. I. duPont deNemours Company. Trichlorotrifluoroethane having a boiling point of 47.6° C. |
| FREON 11B Blowing Agent | E. I. duPont deNemours Company. A stabilized version of trichloromonofluoromethane having a boiling point of 23.8° C. |
| BUTYL CARBITOL | Union Carbide Corporation. Diethylene glycol monobutyl ether with a molecular weight of 162. |
| METHYL CARBITOL | Union Carbide Corporation. Diethylene glycol monomethyl ether with a molecular weight of 120. |
| HEXYL CARBITOL | Union Carbide Corporation. Diethylene glycol monohexyl ether with a molecular weight of 190. |
| METHYL CARBITOL | Union Carbide Corporation. Diethylene glycol monomethyl ether with a molecular weight of 120. |
| PROPASOL SOLVENT B | Union Carbide Corporation. Butoxypropanol with a molecular weight of 132. |
| PROPASOL SOLVENT P | Union Carbide Corporation. Propoxypropanol with a molecular weight of 116. |
| PHENYL | Union Carbide Corporation. |

-continued

TRADE NAME DESIGNATION TABLE

| Trade Designation | Identification of Component(s) and source of same |
|---|---|
| CELLOSOLVE PHENYL | Ethylene glycol monophenyl ether with a molecular weight of 138. Union Carbide Corporation. |
| CARBITOL | Diethylene glycol monophenyl ether with a molecular weight of 182. Union Carbide Corporation. |
| UCON LUBRICANT 50HB660 | A monobutyl ether of a polyoxyalkylene glycol with an average molecular weight of about 2000. Union Carbide Corporation. |
| UCON LUBRICANT LB285 | A monobutyl ether of polypropylene glycol with an average molecular weight of 979. |
| TP-90B Plasticizer | Thiokol Chemical Company. $C_4H_9OC_2H_4OC_2H_4OCH_2OC_2H_4OC_2H_4OC_4H_9$ |
| CARBOWAX 750 | UNION CARBIDE CORPORATION Methoxypolyethyleneoxyglycol found by analysis to have a hydroxyl number of about 76.8 or an equivalent weight of about 730. |
| SILICONE SURFACTANT L-548 | UNION CARBIDE CORPORATION A non-hydrolyzable polyoxyalkylene polydimethylsiloxane liquid having an apparent specific gravity of 25/25° C. of 1.03 and a viscosity 25° C. (centistokes) of 1250. |
| NIAX POLYOL 12-56 | UNION CARBIDE CORPORATION High primary hydroxyl-containing polyoxyethyleneoxypropylene diol of 2000 molecular weight, having an ethyleneoxy content of about 50% by weight. |
| NIAX POLYOL 11-27 | UNION CARBIDE CORPORATION High primary hydroxyl-containing polyoxyethyleneoxypropylene triol/diol mixture containing about 15% by weight of ethyleneoxy-capped end-blocks, having a hydroxyl number of about 27, and a hydroxyl equivalent weight of about 2000. |
| L-5309 SURFACTANT | UNION CARBIDE CORPORATION A non-hydrolyzable polyoxyalkylene-polydimethylsiloxane surfactant, known as an especially useful compound for the manufacture of high-resiliency flexible polyether foams. |

The following Examples are illustrative of the invention but are not to be construed as to limiting the scope thereof in any manner. In the specification, the following should be noted:

Room temperature refers to a temperature of 20° C.-23° C. unless a different temperature is indicated.

Percent refers to percent by weight unless indicated otherwise.

Parts refers to parts by weight unless indicated otherwise.

80/20 TDI refers to an isomeric mixture of 80 parts of 2,4-tolylene diisocyanate and 20 parts of 2,6-tolylene diisocyanate.

MDI refers to a diphenylmethane diisocyanate. 4,4'-MDI refers to 4,4'-diphenylmethane diisocyanate.

Isocyanate Index is the quotient obtained by dividing the equivalents of NCO by the sum of the equivalents of active hydrogen group(s), multiplied by 100. By way of illustration, a conventional formulation for the manufacture of integral skin microcellular shoe soles may comprise Isonate 240** (quasi-prepolymer of modified 4,4'-MDI and a copolyester diol) as Component A and, as Component B, a mixture comprising polyester polyol, 1,4-butanediol chain extender, water, etc. The isocyanate index, expressed in equation form, is shown below:

$$\text{Isocyanate Index} = \frac{\Sigma \text{ Equivalent NCO}}{\Sigma \text{ Total Equivalent OH}} \times 100$$

wherein "Σ total equivalent OH" represents the sum of the equivalent(s) of polyol, 1,4-butanediol and water. In the practice of the present inventions the isocyanate index is generally a number in the range of from about 90 to about 120 depending on the resulting polyurethane product, e.g., flexible foam, microcellular elastomer, solid elastomer, and the like. Expressed in a different manner, the ratio of NCO/OH equivalents is generally in the range of from about 0.9:1.2, desirably from about 0.9:1.1, preferably from about 0.95:1.05, and for many applications generally about 1:1.

As used herein including the appended claims, reference to "compatible homogeneous liquid mixture of polyol(s) and flow modifier(s)" shall mean that such mixture (of polyol(s) and flow modifier(s) and optionally chain extender, with/without other well-known urethane ingredients which may be included in the polyol resin package such as catalyst, blowing agent, cell regular, etc.) is a stable, homogeneous liquid blend at approximately room temperature, e.g., 20° C.-23° C., or if otherwise, the mixture can be made into a stable, homogeneous liquid state at 20° C.-40° C. by heating to a moderately elevated temperature, e.g., 80° C. to 100° C. for 0.5 to 2 hour, followed by slow cooling to about 20° C.-40° C. The term "mixture of polyol(s) and flow modifier(s)" shall mean, unless the text indicates otherwise, a compatible homogeneous liquid mixture referred to above as well as mixtures of polyol(s) and flow modifier(s) that are not compatible at the aforesaid lower temperatures but which, under the reaction conditions employed to form polyurethane products, are liquid and convertible by reaction with organic polyisocyanate compounds to such polyurethane products.

EXAMPLE 1

A series of isocyanate-ether alcohol reaction products were prepared and their compatibility with polyester polyols useful in the manufacture of microcellular foams was investigated and noted. The resulting blends were tested for viscosity at room temperature (23° C.) and 30° C., and used in a typical shoe product formulation and tested for Ross flex at −18° C. (ASTM D-1052).

A. Synthesis of Reaction Product A

In this experiment, Butyl Carbitol (diethylene glycol monobutyl ether having a molecular weight of 162 and a functionality of 1) was reacted with tolylene diisocyanate (80% 2,4- and 20% 2,6-tolylene diisocyanate) having a molecular weight of 174 and a functionality of 2 at an OH/NCO ratio of 1. Starting at room temperature, a clean dry jar was charged with 32.5 gms of Butyl Carbitol and to this 17.4 gms of tolylene diisocyanate was added. The jar was capped tightly and agitated by gentle shaking to mix the components. No heat was applied for the first 10 minutes. The resulting exotherm of the reaction raised the temperature to 55° C. At this point, additional heating was used. The jar was placed in a hot air oven and maintained for 3 hours at 70° C. to complete the reaction. After allowing the reaction product to cool to room temperature overnight, the following observations were made. The reaction product, hereafter referred to as Reaction Product A, was slightly viscous, clear liquid with a dark yellow color. It was also noted that this product was compatible with Polyester A (a polyester polyol) at a weight ratio of 80 parts of polyester polyol to 20 parts of the Reaction Product A. The resulting polyester polyol/Reaction Product A mixture had a viscosity of 25,800 centipoises at 23° C. and 13,500 centipoises at 30° C.

B. Synthesis of Reaction Product B

The process used to make Reaction Product A was repeated using 34.3 gms of Hexyl Carbitol (diethylene glycol monohexyl ether with a molecular weight of 190 and a functionality of 1) and 15.7 gms of 80/20 2,4- 2,6-tolylene diisocyanate. After 10 minutes the temperature of this reaction was 43° C. The reaction mixture was heated at 70° C. for 3 hours as in the preparation of Reaction Product A to complete the reaction. The resulting product, hereafter referred to as Reaction Product B, was a clear, light yellow, slightly viscous liquid at room temperature. It proved to be compatible with Polyester A at a weight ratio of 80 parts of Polyester A to 20 parts of Reaction Product B. The viscosity of Polyester A/Reaction Product B mixture was 22,600 centipoises at 23° C., and 11,500 centipoises at 30° C.

C. Synthesis of Reaction Product C

In this experiment 29.0 gms of Methyl Carbitol (diethylene glycol monomethyl ether with a molecular weight of 120 and a functionality of 1) were reacted with 21.0 gms of 80/20 2,4- 2,6-tolylene diisocyanate using the process of (A) above. After 10 minutes the exotherm of this reaction had increased the temperature of the mixture to 60° C. The reaction mixture was heated for 3 hours at 70° C. and cooled overnight to room temperature as in (A) above. The product (Reaction Product C) was a transparent dark yellow viscous liquid. A compatible mixture of 20 parts by weight of Reaction Product C and 80 parts by weight of Polyester A had a viscosity of 30,500 centipoises at 23° C., and 16,700 centipoises at 30° C.

D. Synthesis of Reaction Product D

Reaction Product D was prepared using 35.2 gms of butoxy triglycol having a molecular weight of 206 and a functionality of 1 and 14.8 gms of 80/20 2,4- 2,6-tolylene diisocyanate. The temperature of the mixture after the first 10 minutes, without added heat, was 44° C. Following the heating and cooling procedure of A above, the product was observed to be a clear, light yellow, slightly viscous liquid at room temperature. This product (Reaction Product D) was compatible with Polyester A** at a weight ratio of 80 parts Polyester A to 20 parts of Reaction Product D. The resulting polyester polyol Reaction Product D blend had a viscosity of 21,000 centipoises at 23° C., and 13,400 centipoises at 30° C.

E. Synthesis of Reaction Product E

Using 30.2 gms of Propasol Solvent B (butoxypropanol) and 19.9 gms of 80/20 2,4- 2,6-tolylene diisocyanate (TDI), Reaction Product E was prepared following the same procedure used in (A) above. The temperature observed after 10 minutes, without added heat, was 37° C. The reaction mixture was heated and cooled as described previously. There was obtained a transparent, light yellow, viscous liquid (Reaction Product E) which was compatible with Polyester A at a weight ratio of 80 parts of Polyester A to 20 parts of Reaction Product E. The viscosity of this blend was 27,400 centipoises at 23° C., and 13,600 centipoises at 30° C.

F. Synthesis of Reaction Product F

In this experiment the jar was charged with 28.6 gms of Propasol Solvent P** (propoxypropanol having a molecular weight of 116 and a functionality of 1) and reacted with 2.14 gms of 80/20 2,4- 2,6-tolylene diisocyanate. The addition reaction was conducted following the process used to make Reaction Product A. After 10 minutes, the exotherm had increased the temperature to 40° C. Heating and cooling were carried out under the same conditions used to make Reaction Product A. This produced a clear, light yellow, viscous liquid at room temperature, i.e., Reaction Product F. A blend of 80 parts Polyester A/20 parts Reaction Product F was compatible, and possessed a viscosity of 28,500 centipoises at 23° C., and 15,600 centipoises at 30° C.

G. Synthesis of Reaction Product G

In this experiment Butyl Carbitol was reacted with Isonate 125M (high purity 4,4'-diphenylmethane diisocyanate). In this reaction 405.6 gms of Butyl Carbitol were charged to a 1 liter reaction flask, maintained under a nitrogen atmosphere, fitted with a stirrer, thermometer, reflux condenser, and feed inlet. The internal temperature of the reaction flask was raised as necessary by heating the outside of the flask with a heat mantle controlled by a rheostat. The Butyl Carbitol was preheated to 94° C. The 4,4'-MDI was added in three increments with good agitation. The first addition of 4,4'-MDI of 125.7 gms brought the temperature of the mixture to 139° C. within 5 minutes. This being an exothermic reaction, the reaction product mixture was allowed to cool to 62° C. before the second 4,4'-MDI addition of 127.7 gms was made. After 20 minutes a temperature of 94° C. was recorded and the third addition of 4,4'-MDI (59.2 gms) was made. The total amount of Isonate 125M added was 312.6 gms. With moderate heating a temperature of 92° C. to 118° C. was maintained for 2 hours to complete the reaction. Agitation was maintained throughout the entire procedure. Upon cooling to room temperature the product (Reaction Product G) of this reaction was observed to be a very viscous liquid with large crystals forming. At 35° C., it was a hazy liquid with a viscosity of 12,620 centipoises. At temperatures above 95° C., it was a clear light yellow liquid. Reaction Product G was also examined for compatibility with Polyester A. In view of the hazy, semicrystalline nature of this product at room temperature, an 80/20 Polyester A/Reaction Product G mixture was heated to 95° C., agitated, and then allowed to cool to room temperature. The result was a clear, compatible mixture with a viscosity of 30,750 centipoises at 23° C., and 13,530 centipoises at 30° C.

H. Synthesis of Reaction Product H

Reaction Product H was prepared by reacting Butyl Carbitol and Mondur MR (a crude polymethylene polyphenyl polyisocyanate having an isocyanate content of about 31.5% by weight and an isocyanate equivalent of about 133.4). A 1 liter reaction flask was charged with 405.6 gms of Butyl Carbitol. A total of 333.5 gms of Mondur MR was required for a complete reaction at a stoichiometric NCO/OH ratio of one. The Butyl Carbitol was preheated to 82° C., and with good agitation the polyisocyanate added in three increments. The exotherm from the first addition of 144.1 gms of polyisocyanate raised the temperature to 120° C., within 10 minutes. A second addition of 109.7 gms of polyisocyanate was made when the temperature subsided to 92° C., and after 20 minutes a peak temperature of 109° C. was noted. The third increment of 79.7 gms of polyisocyanate was added at 99.5° C. Moderate heating and continued agitation was used to maintain the temperature between 99° C. and 107° C. for 2 hours to complete the reaction. The resulting product (Reaction Product H) was a dark brown liquid with a viscosity of 342,800 centipoises at 23° C., and 66,400 centipoises at 35° C. Although the color was very dark it was transparent with no solids evident.

In view of the high viscosity of Reaction Product H, an 80/20 Polyester A**/Reaction Product H blend was heated to 95° C. to facilitate mixing then allowed to cool to room temperature and checked for compatibility. There was obtained a compatible mixture with a viscosity of 37,000 centipoises at 23° C. and 16,190 centipoises at 30° C.

I. Synthesis of Reaction Product I

To a one liter reaction flask, there were charged 730 gms (1 equivalent) of Carbowax 750 and heated to 50° C. A total of 87 gms (0.5 equivalent) of 80/20 2,4-, 2,6-tolylene diisocyanate was then added and the resulting exothermic reaction proceeded to over 100° C. Heat was applied to maintain the reaction product mixture at about 110° C. for 2 hours under an atmosphere of nitrogen. Upon cooling to room temperature there was obtained a white-yellowish waxy product having a melting point range of about 30° C.-35° C. This product (Reaction Product I) was blended with Niax Diol 12-56 at a ratio of 75/25 Niax Diol 12-56 to Reaction Product I, heated to 50° C., whereupon there was formed a homogeneous mixture. Upon cooling to room temperature, the mixture remained compatible.

J. Synthesis of Reaction Product K

Reaction Product K was prepared by reacting the ethylene oxide adduct of nonylphenol, having a hydroxyl value of 51, and a hydroxyl equivalent weight of 1100, correspnding to an addition product of about 20 ethyleneoxy units per phenolic hydroxyl group, with the 80/20 mixture of 2,4- and 2,6-tolylene diisocyanate in an equivalent ratio of NCO/OH equal to one. A one liter reaction flask was charged with 700 gms of the phenolethylene oxide reaction product (corresponding to 0.636 equivalent of OH), the waxy material was heated to 50° C., and agitated under a stream of nitrogen. A total of 56.0 gms of the tolylene diisocyanate mixture (corresponding to 0.644 equivalent of NCO) was added under good agitation, and the resulting exotherm reached 95° C. The reaction product mixture was further heated to 105° C. for two hours, still under nitrogen. Upon cooling, there was obtained a slightly off-white waxy product that melted at 30° C.-35° C. This product (Reaction Product K) was blended with Niax Diol 12-56** at a ratio of 60/40 Niax Diol 12-56 to Reaction Product K, heated to 60° C., properly mixed and allowed to cool to room temperature. The product blend remained compatible for several weeks before it was employed for further experimentation.

FOAM EXPERIMENTS AND SHOE SOLE PARTS

Hand foam experiments comprising the manufacture of microcellular polyurethane foams from a diethylene glycol adipate polyester polyol (Polyester A), ethylene glycol extender, and an isocyanate prepolymer (Mondur E-501* or Isonate 240) were conducted to test the suitability of using the Reaction Products A through H of Example 1 in polyurethane foams. Control foams were also made without flow modifier (blank) or with TP-90B (di[2-(2-butoxyethoxy)ethoxy]methane). The resulting foams had open cells with good cell structure. These foams were prepared using a hand-mixe process at room temperature.

Shoe sole parts were also prepared using the same hand-mix process and casting the foam mixture into an epoxy mold held at a temperature of 30° C.-35° C. Excellent polyurethane parts were produced with the exception of Reaction Products G and H which produced shoe sole parts exhibiting slight shrinkage at the 90/10 polyester polyol/Reaction Product level. All other shoe sole parts did not shrink at the density tested. Reaction Products G and H were prepared using a 4,4'-diphenylmethane diisocyanate as a reactant. The formulations might have to be optimized with regard to the catalyst and surfactant type to avoid all shrinkage, as had been the case with the other flow modifiers tested (Reaction Products A, B, C, D, E, F). The slight shrinkage of Reaction Products G and H did not detract from their exhibiting excellent flex lives at low temperature. A one by six inch strip was die cut from each of the shoe soles and tested for flex properties in a Ross Flex Tester at −18° C. (ASTM D-1052). All samples prepared using the Reaction Products A through H of Example 1 and TP-90B** show superior flex properties compared to the control formulation (without flow modifier). The specific results of the overall study are described in Table I infra.

TABLE I

| FORMULATION | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Polyester A** | 100.0 | 80.0 | 80.0 | 80.0 | 80.0 | 80.0 | 80.0 | 80.0 | 90.0 | 80.0 | 70.0 | 60.0 | 90.0 | 80.0 | 70.0 | 60.0 |
| TP-90 B** | — | 20.0 | — | — | — | — | — | — | — | — | — | — | — | — | — | — |
| Reaction Product A | — | — | 20.0 | — | — | — | — | — | — | — | — | — | — | — | — | — |
| Reaction Product B | — | — | — | 20.0 | — | — | — | — | — | — | — | — | — | — | — | — |
| Reaction Product C | — | — | — | — | 20.0 | — | — | — | — | — | — | — | — | — | — | — |
| Reaction Product D | — | — | — | — | — | 20.0 | — | — | — | — | — | — | — | — | — | — |
| Reaction Product E | — | — | — | — | — | — | 20.0 | — | — | — | — | — | — | — | — | — |
| Reaction Product F | — | — | — | — | — | — | — | 20.0 | — | — | — | — | — | — | — | — |

TABLE I-continued

| FORMULATION | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Reaction Product G | — | — | — | — | — | — | — | — | 10.0 | 20.0 | 30.0 | 40.0 | — | — | — | — |
| Reaction Product H | — | — | — | — | — | — | — | — | — | — | — | — | 10.0 | 20.0 | 30.0 | 40.0 |
| Ethylene Glycol | 11.0 | 11.0 | 11.0 | 11.0 | 11.0 | 11.0 | 11.0 | 11.0 | 11.0 | 11.0 | 11.0 | 11.0 | 11.0 | 11.0 | 11.0 | 11.0 |
| L 5340** | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Silicone A** | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| DABCO 33LV | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| N,N,N',N'—tetramethyl-butaneediamine | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| SYNCAT M 601** | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| FREON 113** | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| MONDUR E-501** | 96.8 | 93.4 | 93.4 | 93.4 | 93.4 | 93.4 | 93.4 | 93.4 | — | — | — | — | — | — | — | — |
| ISONATE 240** | — | — | — | — | — | — | — | — | 95.8 | 94.1 | 92.4 | 90.7 | 95.8 | 94.1 | 92.4 | 90.7 |
| Cup Foam: | | | | | | | | | | | | | | | | |
| Cream Time (sec) | 15 | 15 | 15 | 15 | 15 | 15 | 15 | 15 | 18 | 17 | 18 | 18 | 14 | 14 | 12 | 15 |
| Rise Time (sec) | 50 | 45 | 43 | 42 | 42 | 43 | 45 | 42 | 45 | 50 | 57 | 46 | 42 | 42 | 38 | 42 |
| Tack Free Time | 60 | 70 | 70 | 72 | 70 | 75 | 70 | 70 | 65 | 70 | 82 | 82 | 60 | 65 | 64 | 65 |
| Snap Time (sec) | 100 | 105 | 110 | 105 | 100 | 110 | 105 | 105 | 95 | 110 | 140 | 140 | 95 | 108 | 100 | 100 |
| Free blow density (lbs/ft.$^3$) | 10.8 | 10.4 | 10.8 | 10.8 | 9.9 | 11.0 | 10.9 | 10.5 | 10.7 | 11.1 | 12.2 | 11.3 | N.T. | 11.6 | 11.0 | 11.0 |
| Cells per cm | >50 | >50 | >60 | >80 | >60 | >60 | >60 | >60 | >60 | >60 | >60 | >60 | >60 | >80 | >80 | >80 |
| Molded Shoe Sole | | | | | | | | | | | | | | | | |
| Demold Time (min) | 5 | 5 | 5 | 5 | 5 | 5 | 5 | 5 | 5 | 5 | 7 | 10 | 5 | 5 | 7 | 7 |
| Density (g/cc.) | 0.33 | 0.32 | 0.35 | 0.34 | 0.34 | 0.35 | 0.33 | 0.34 | 0.49 | 0.50 | 0.51 | 0.51 | 0.50 | 0.51 | 0.51 | 0.51 |
| Hardness - Shore A (ASTM D 2240-75) | 50 | 46 | 48 | 48 | 48 | 52 | 53 | 50 | 72 | 72 | 68 | 66 | 72 | 72 | 71 | 70 |
| Ross Flex at −18° C. (× 10$^3$ cycles) | <8 | 218 | >272 | >272 | >272 | >272 | >272 | 242 | 145.7 | 114.8 | >266 | >266 | >266 | >266 | 136.8 | 146.2 |
| Cut Growth (%) | | | | | | | | | | | | | | | | |
| at 272,000 cycles | complete | complete | None | None | 160 | 75 | 5 | complete | | | | | | | | |
| at 266,000 cycles | | | | | | | | | complete | complete | 65 | 40 | 30 | None | complete | complete |

N.T. — not tested
** — described previously

EXAMPLE 2

Synthesis of Reaction Product J

Reaction Product J is a larger batch of Reaction Product A supra and was prepared for evaluation as follows. A 5 liter reaction flask, fitted with a stirrer, thermometer, feed inlet, and reflux condenser, was maintained under a nitrogen atmosphere. The internal temperature of the reactor was raised as necessary by heating the outside of the flask with a heating mantle controlled by a rheostat. To this flask 2593 gms of Butyl Carbitol were charged with moderate heat being applied. Starting at 30° C. and with continuous stirring, the first of three tolylene diisocyanate (80% 2,4- 20% 2,6-TDI isomeric mixture) additions, 522.3 gms., was added over a one minute period and the increase in temperature observed. After 18 minutes the temperature of the reaction product mixture was 84° C. and the heater was turned off. The temperature peaked at 93° C. (33 minutes after the first addition). With the temperature at 92° C., a second tolylene diisocyanate addition of 478.5 gms was made. Some slight discoloration was noted as the temperature increased over 100° C. A peak temperature of 123.5° C. was reached 18 minutes after the second addition. When the temperature subsided to 80.5° C. the third addition of 392.6 gms of tolylene diisocyanate was made. The total amount of tolylene diisocyanate used was 1393.4 gms. The exotherm peaked 15 minutes after this addition and a temperature of 94° C. was noted. Moderate heat was again applied to maintain the temperature of the reaction product mixture between 94° C. and 101° C. for 3 hours to complete the reaction. Agitation was maintained throughout the experiment. The product of this reaction, hereafter referred to as Reaction Product J, was a dark yellow transparent liquid with a viscosity of 7,600 centipoises at 23° C. This product was tested for compatibility with Polyester A polyester polyol and Polyester B polyester polyol with/without Niax Polyol 12-56, a high primary hydroxyl-containing polyoxyethyleneoxypropylene diol of 2000 molecular weight, and fluorocarbon blowing agents FREON 11B and FREON 113. The results of this study are described in Table II.

nate (TDI). To the 5 liter reaction flask described in Example 2 supra and maintained under a nitrogen atmosphere, there were charged 4000 gms of Ucon Lubricant 50HB660. Beginning at room temperature, 174.3 gms of the TDI were added under stirring. Moderate heat was applied and the temperature of the mixture rose to 85° C. over a period of two hours. The temperature of the reaction product mixture was maintained between 85° C. and 90° C. under continuous stirring for five hours. Upon cooling to room temperature there was obtained a yellow transparent liquid (Reaction Product L) with a viscosity of 536 centipoises at 25° C. Reaction Product L was also examined for compatibility with polyester polyols (Polyester A and Polyester B), with/without polyether polyol (Niax Polyol

TABLE II

| FORMULATIONS | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Polyester A** | 90.0 | 80.0 | 70.0 | | | | 70.0 | 60.0 | 50.0 | | | | 90.0 | 80.0 | 70.0 |
| Polyester B** | | | | 90.0 | 80.0 | 70.0 | | | | 70.0 | 60.0 | 50.0 | | | |
| NIAX POLYOL 12-56** | | | | | | | 10.0 | 20.0 | 30.0 | 10.0 | 20.0 | 30.0 | | | |
| FREON 113** | | | | | | | | | | | | | 10.0 | 10.0 | 10.0 |
| FREON 11B** | | | | | | | | | | | | | | | |
| Reaction Product J | 10.0 | 20.0 | 30.0 | 10.0 | 20.0 | 30.0 | 20.0 | 20.0 | 20.0 | 20.0 | 20.0 | 20.0 | 10.0 | 20.0 | 30.0 |
| Viscosity (centipoises) × 10³ | | | | | | | | | | | | | | | |
| at 23° C. | 20.0 | 17.0 | 14.3 | 26.9 | 24.4 | 18.5 | 14.5 | N.T. | N.T. | 14.5 | 11.2 | 6.03 | 11.4 | 8.91 | 7.51 |
| at 35° C. | 11.4 | 10.0 | 9.23 | 16.7 | 13.5 | 9.44 | 6.50 | N.T. | N.T. | 8.78 | 5.60 | 3.61 | 7.06 | 5.35 | 4.52 |
| Observations | 1 6 | 1 6 | 1 6 | 4 | 3 | 2 | 1 6 | 1 5 | 1 5 | 1 6 | 2 | 2 | 1 6 | 1 6 | 1 6 |

| FORMULATIONS | 16 | 17 | 18 | 19 | 20 | 21 | 22 | 23 | 24 | 25 | 26 | 27 | 28 | 29 |
|---|---|---|---|---|---|---|---|---|---|---|---|---|---|---|
| Polyester A** | | | | 90.0 | 80.0 | 70.0 | | | | 90.0 | 80.0 | 70.0 | | |
| Polyester B** | 90.0 | 80.0 | 70.0 | | | | 90.0 | 80.0 | 70.0 | | | | 90.0 | 80.0 |
| NIAX POLYOL 12-56** | | | | | | | | | | 10.0 | 20.0 | 30.0 | 10.0 | 20.0 |
| FREON 113** | 10.0 | 10.0 | 10.0 | | | | | | | | | | | |
| FREON 11B** | | | | 8.0 | 8.0 | 8.0 | 8.0 | 9.0 | 8.0 | | | | | |
| Reaction Product J | 10.0 | 20.0 | 30.0 | 10.0 | 20.0 | 30.0 | 10.0 | 20.0 | 30.0 | | | | | |
| Viscosity (centipoises) × 10³ | | | | | | | | | | | | | | |
| at 23° C. | 14.9 | 12.7 | 10.4 | 11.6 | 10.2 | 8.50 | 15.9 | 13.9 | 11.5 | 16.9 | N.T. | N.T. | 21.2 | 14.1 |
| at 35° C. | 8.98 | 7.22 | 6.21 | 6.48 | 5.82 | 5.14 | 8.77 | 6.78 | 5.47 | 9.32 | N.T. | N.T. | 12.6 | 8.53 |
| Observations | 1 6 | 1 6 | 1 6 | 1 6 | 1 6 | 1 6 | 1 6 | 1 6 | 1 6 | 2 | 4 5 | 4 5 | 1 6 | 1 6 |

1 = clear
2 = slightly hazy
3 = some haze
4 = very hazy
5 = separation
6 = compatible N.T. = not tested because of separation or poor compatibility; Polyether Reaction Products I and K which are based on substantially longer polyethyleneoxy chains than Reaction Product J are readily compatible in the Niax Polyol 12-56**. Hence, it is suggested to select the appropriate composition of the flow modifier to effect optimized compatibility in polyether or polyester polyols, as the case may warrant.

EXAMPLE 3

Synthesis of Reaction Product L

Reaction Product L was prepared using Ucon Lubricant 50HB660 and 80/20 2,4- 2,6-tolylene diisocya- 12-56), and the fluorocarbon blowing agents (Freon 11B and Freon 113). The results of this study are described in the Table III infra.

TABLE III

| FORMULATION | 1 | 2 | 3 | 4 | 5 | 6 | 7 | 8 | 9 | 10 | 11 | 12 |
|---|---|---|---|---|---|---|---|---|---|---|---|---|
| Polyester A** | 90.0 | 80.0 | 70.0 | | | | 70.0 | 60.0 | 50.0 | | | |
| Polyester B** | | | | 90.0 | 80.0 | 70.0 | | | | 70.0 | 60.0 | 50.0 |
| NIAX POLYOL 12-56** | | | | | | | 10.0 | 20.0 | 30.0 | 10.0 | 20.0 | 30.0 |
| FREON 113** | | | | | | | | | | | | |
| FREON 11B** | | | | | | | | | | | | |
| Reaction Product L | 10.0 | 20.0 | 30.0 | 10.0 | 20.0 | 30.0 | 20.0 | 20.0 | 20.0 | 20.0 | 20.0 | 20.0 |
| Viscosity (centipoises) × 10³ | | | | | | | | | | | | |
| at 23° C. | N.T. | N.T. | N.T. | 23.7 | 20.6 | 12.3 | N.T. | N.T. | N.T. | 12.3 | 8.04 | 5.20 |
| at 35° C. | N.T. | N.T. | N.T. | 15.9 | 12.5 | 9.35 | N.T. | N.T. | N.T. | 7.97 | 5.20 | 3.20 |
| Observations | 4 | 4 | 4 | 1 5 | 1 6 | 1 6 | 4 | 4 | 4 | 1 5 | 1 6 | 1 6 |

| FORMULATIONS | 13 | 14 | 15 | 16 | 17 | 18 | 19 | 20 | 21 | 22 | 23 | 24 |
|---|---|---|---|---|---|---|---|---|---|---|---|---|
| Polyester A** | 90.0 | 80.0 | 70.0 | | | | 90.0 | 80.0 | 70.0 | | | |
| Polyester B** | | | | 90.0 | 80.0 | 70.0 | | | | 90.0 | 80.0 | 70.0 |
| NIAX POLYOL 12-56** | | | | | | | | | | | | |
| FREON 113** | 10.0 | 10.0 | 10.0 | 10.0 | 10.0 | 10.0 | | | | | | |
| FREON 11B** | | | | | | | 8.0 | 8.0 | 8.0 | 8.0 | 8.0 | 8.0 |

TABLE III-continued

| Reaction Product L | 10.0 | 20.0 | 30.0 | 10.0 | 20.0 | 30.0 | 10.0 | 20.0 | 30.0 | 10.0 | 20.0 | 30.0 |
|---|---|---|---|---|---|---|---|---|---|---|---|---|
| Viscosity (centipoises) × 10³ | | | | | | | | | | | | |
| at 23° C. | N.T. | N.T. | N.T. | 12.7 | 12.0 | N.T. | N.T. | N.T. | N.T. | 12.4 | 10.9 | N.T. |
| at 35° C. | N.T. | N.T. | N.T. | 7.78 | 7.00 | N.T. | N.T. | N.T. | N.T. | 7.39 | 5.97 | N.T. |
| Observations | 4 | 4 | 4 | 1 5 | 4 6 | 4 | 4 | 4 | 4 5 | 1 6 | 4 5 | 4 5 |

1 = clear
2 = slightly hazy
3 = some haze
4 = very hazy
5 = separation
6 = compatible
N.T. = not tested because of separation or poor compatibility.

EXAMPLE 4

Synthesis of Reaction Product M

Reaction Product M was prepared using Ucon Lubricant LB285 and Isonate 125 (4,4'-MDI). To a 500 ml. reaction flask equipped as described in Example 2 and maintained under a nitrogen atmosphere, there were charged 222.5 gms of Ucon Lubricant LB285 and heated to 70° C. Under conditions stirring 56.8 gms of the 4,4'-MDI were added and the temperature of the resulting reaction mixture rose to 90° C. within 10 minutes. The temperature was maintained between about 90°–95° C. for four hours. There was obtained a white hazy liquid with a viscosity of 2,530 centipoises at 23° C.

EXAMPLE 5

A series of hand foam experiments were conducted using Mondur F-501 and Polyester A or Polyester B and Reaction Products J, L and M (Examples 2–4 supra) as well as TP-90B in a typical microcellular polyurethane foam formulation as described in Example I, and cast in an epoxy shoe sole mold. The polyester polyol/flow modifier varied from 90/10 to 60/40 and very good polyurethane parts were obtained. At the 90/10 and 80/20 polyester polyol/flow modifier ratios, the polyurethane parts tested were excellent and were characterized by smooth, strong skins. The data and results are set forth in Table IV infra.

TABLE IV

| FORMULATION | 1 | 2 | 3 | 4 | 5 | 6 | 7 | 8 | 9 | 10 | 11 | 12 | 13 |
|---|---|---|---|---|---|---|---|---|---|---|---|---|---|
| Polyester A** | 90.0 | 90.0 | 90.0 | 90.0 | 80.0 | 80.0 | 80.0 | 70.0 | 60.0 | | | | |
| Polyester B** | | | | | | | | | | 90.0 | 90.0 | 90.0 | 90.0 |
| Reaction Product J | 10.0 | | | | 20.0 | | | 30.0 | 40.0 | 10.0 | | | |
| Reaction Product L | | 10.0 | | | | 20.0 | | | | | 10.0 | | |
| Reaction Product M | | | 10.0 | | | | | | | | | 10.0 | |
| TP-90B** | | | | 10.0 | | | 20.0 | | | | | | 10.0 |
| Ethylene Glycol | 11.0 | 11.0 | 11.0 | 11.0 | 11.0 | 11.0 | 11.0 | 11.0 | 11.0 | | | | |
| 1,4 Butanediol | | | | | | | | | | 11.5 | 11.5 | 11.5 | 11.5 |
| L 5340** | 0.1 | 0.1 | 0.1 | 0.1 | 0.1 | 0.1 | 0.1 | 0.1 | 0.1 | | | | |
| Silicone A** | 0.2 | 0.2 | 0.2 | 0.2 | 0.2 | 0.2 | 0.2 | 0.2 | 0.2 | | | | |
| DABCO 33LV** | 0.9 | 0.9 | 0.9 | 0.9 | 0.9 | 0.9 | 0.9 | 0.9 | 0.9 | 0.6 | 0.6 | 0.6 | 0.6 |
| N,N,N',N'—tetra methylbutanediamine | 0.3 | 0.3 | 0.3 | 0.3 | 0.3 | 0.3 | 0.3 | 0.3 | 0.3 | | | | |
| SYNCAT M 601** | 0.1 | 0.1 | 0.1 | 0.1 | 0.1 | 0.1 | 0.1 | 0.1 | 0.1 | 0.5 | 0.5 | 0.5 | 0.5 |
| Water | | | | | | | | | | 0.2 | 0.2 | 0.2 | 0.2 |
| FREON 113** | 10.0 | 10.0 | 10.0 | 10.0 | 10.0 | 10.0 | 10.0 | 10.0 | 10.0 | | | | |
| FREON 11B | | | | | | | | | | 6.0 | 6.0 | 6.0 | 6.0 |
| MONDUR E-501** | 95.3 | 95.3 | 95.3 | 95.3 | 95.6 | 93.6 | 93.6 | 91.9 | 90.2 | 77.8 | 77.8 | 77.8 | 77.8 |
| Index | 1 | 1 | 1 | 1 | 1 | 1 | 1 | 1 | 1 | 1 | 1 | 1 | 1 |
| Cream Time (sec) | 18 | 15 | 15 | 17 | 18 | 16 | 19 | 20 | 20 | 25 | 22 | 25 | 25 |
| Rise Time (sec) | 50 | 45 | 45 | 50 | 52 | 47 | 55 | 55 | 55 | 65 | 65 | 65 | 65 |
| Tack Free Time (sec) | 75 | 75 | 65 | 75 | 75 | 68 | 80 | 105 | 120 | 65 | 65 | 65 | 65 |
| Snap Time (sec) | 120 | 120 | 120 | 130 | 140 | 150 | 160 | 165 | 210 | 75 | 75 | 73 | 75 |
| Demold Time (min) | 5 | 5 | 5 | 5 | 5 | 5 | 5 | 5 | 5 | 5 | 5 | 5 | 5 |
| Density (g./cc.) | 0.34 | 0.34 | 0.33 | 0.34 | 0.33 | 0.34 | 0.36 | 0.34 | 0.34 | 0.45 | 0.47 | 0.47 | 0.45 |
| Hardness (Shore A) (ASTM D2240-75) | 51. | 46. | 49. | 46. | 48. | 48. | 46. | 48. | 46 | 51 | 52 | 60 | 51 |
| Cells per cm. | 60 | 60 | 60 | 60 | 50 | 50 | 50 | 50 | 50 | 70 | 80 | 50 | 50 |
| Observations | 1 | 2 | 1 | 1 | 1 | 1 | 1 | 1 | 1 | 1 | 1 | 1 | 1 |

| FORMULATION | 14 | 15 | 16 | 17 |
|---|---|---|---|---|
| Polyester A** | | | | |
| Polyester B** | 80.0 | 80.0 | 80.0 | 80.0 |
| Reaction Product J | 20.0 | | | |
| Reaction Product K | | 20.0 | | |
| Reaction Product L | | | 20.0 | |
| TP-90B** | | | | 20.0 |
| Ethylene Glycol | | | | |
| 1,4 Butanediol | 11.5 | 11.5 | 11.5 | 11.5 |
| L 5340** | | | | |
| Silicone A** | | | | |
| DABCO 33LV** | 0.6 | 0.6 | 0.6 | 0.6 |
| N,N,N',N'—tetra methylbutanediamine | | | | |

TABLE IV-continued

|  |  |  |  |  |
|---|---|---|---|---|
| SYNCAT M 601** | 0.5 | 0.5 | 0.5 | 0.5 |
| Water | 0.2 | 0.2 | 0.2 | 0.2 |
| FREON 113** |  |  |  |  |
| FREON 11B | 6.0 | 6.0 | 6.0 | 6.0 |
| MONDUR E-501** | 76.1 | 76.1 | 76.1 | 76.1 |
| Index | 1 | 1 | 1 | 1 |
| Cream Time (sec) | 29 | 28 | 26 | 52 |
| Rise Time (sec) | 70 | 70 | 50 | 70 |
| Tack Free Time (sec) | 75 | 80 | 50 | 75 |
| Snap Time (sec) | 75 | 90 | 75 | 90 |
| Demold Time (min) | 5 | 5 | 5 | 5 |
| Density (g./cc.) | 0.47 | 0.46 | 0.47 | 0.48 |
| Hardness (Shore A) (ASTM D2240-75) | 56 | 46 | 67 | 50 |
| Cells per cm. | 65 | 70 | 8 | 45 |
| Observations | 1 | 1 | 3 | 1 |

1 = good part - no shrinkage noted
2 = slight shrinkage
3 = cells large - also slight set at end of rise

EXAMPLE 6

In a manner similar to Example 2 supra in the preparation of Reaction Product J, there were charged 2593 gms of Butyl Carbitol** to the flask and heated to 68° C. The 80/20 TDI was added to the flask in three increments and the exotherm recorded. The total amount of 80/20 TDI added was 1393.1 gms. There was obtained a light amber liquid product with a viscosity of 6120 centipoises at 23° C. (hereinafter Reaction Product J-2).

Foam formulations were prepared and foamed on a Martin Sweets two-component foam machine (Model MOD.MOD 3A, The Martin Sweets Co., Louisville, KY.). One component comprised Polyester A, Reaction Product J-2, ethylene glycol extender, surfactants (L 5340 and Silicone A), catalysts (Dabco 33LV and Syncat M601), and water. The second component comprised Mondur E-501. These experiments demonstrate the use of water blown system. Formulation 1 of Table V was used as a control. The mold temperature was maintained at approximately 35° C. Test plaques at 2 thicknesses were prepared and tested for physical properties except Ross Flex was run on the 0.50 inch thickness only. The test specimens were maintained under ambient conditions for at least one week prior to conducting the tests. At 80 Polyester A/20 Reaction Product J-2 flow modifier, the flex properties of the molded polyurethane specimen were clearly superior to the control while retaining acceptable tensile and tear properties. The data and results are shown in Table V infra.

TABLE V

| FORMULATION | 1 | | 2 | | 3 | |
|---|---|---|---|---|---|---|
| Polyester A | 100. | | 90.0 | | 80.0 | |
| Reaction Product J-2 | — | | 10.0 | | 20.0 | |
| Ethylene Glycol | 8.15 | | 8.15 | | 8.15 | |
| L 5340 | 0.1 | | 0.1 | | 0.1 | |
| Silicone A | 0.2 | | 0.2 | | 0.2 | |
| DABCO 33 LV | 0.9 | | 0.9 | | 0.9 | |
| N,N,N',N'—tetramethyl-butanediamine | 0.3 | | 0.3 | | 0.3 | |
| SYNCAT M 601 | 0.1 | | 0.1 | | 0.1 | |
| Water | 0.4 | | 0.4 | | 0.4 | |
| MONDUR E-501 | 86.5 | | 84.8 | | 83.1 | |
| Index | 1.0 | | 1.0 | | 1.0 | |
| Cream Time (sec) | 15. | | 15. | | 16. | |
| Rise Time (sec) | 50. | | 55. | | 57. | |
| Tack Free Time (sec) | 70 | | 75 | | 85 | |
| Snap time (sec) | 75 | | 80 | | 100. | |
| Demold Time (min.) | 3–3½ | | 3¼–4 | | 4–4½ | |
| Average Plaque Thickness (in.) | 0.25 | 0.50 | 0.25 | 0.50 | 0.25 | 0.50 |
| Average Plaque Density (g./cc.) | 0.52–0.53 | 0.52–0.53 | 0.52–0.53 | 0.52–0.53 | 0.52–0.53 | 0.52–0.53 |
| Hardness (Shore A) (ASTM D2240-75) | 51 | 51 | 50 | 51 | 49 | 51 |
| Tensile (ASTM D412-75) | | | | | | |
| Break (psi) | 485. | 485. | 535. | 546. | 385. | 427. |
| Elongation (%) | 393. | 387. | 433. | 467. | 413. | 497. |
| Tear (pli) (ASTM D624-73) | 98.7 | 101. | 108. | 124.5 | 94.5 | 106. |
| Ross Flex at −18° C. % cut growth | | | | | | |
| at 5,000 cycles | | 110 | | 70 | | none |
| at 10,000 cycles | | 465 | | 200 | | none |
| 500% cut growth ($\times 10^3$ cycles) | | 10.2 | | 15.5 | | 50. |
| Ross Flex at 23° C. % cut growth | | | | | | |
| at 5,000 cycles | | 60. | | 60. | | none |
| at 10,000 cycles | | 155. | | 135. | | none |
| 500% cut growth | | 16.9 | | 20.1 | | 50. |

TABLE V-continued

| FORMULATION | 1 | 2 | 3 |
|---|---|---|---|
| ($\times 10^3$ cycles) | | | |

EXAMPLE 7

In this Example a series of experiments were conducted using TP-90B, Butyl Carbitol, Ucon Lubricant 50HB660**, and Reaction Product J-3 (preparation of which is described hereinafter). In these experiments, the polyether monoalcohol, i.e., Butyl Carbitol and Ucon Lubricant 50HB660, were employed in the polyol resin portion and reacted with the isocyanate component in a "one step" process. Inasmuch as Reaction Product J (Example 2), Reaction Product J-2 (Example 6), and Reaction Product J-3 (Example 7) involved the addition reaction of a weight ratio of 13 parts of Butyl Carbitol to 7 parts of 80/20 TDI, there were employed 13 parts of Butyl Carbitol and 20 parts of Reaction Product J-3 in the following experiments documented in Table VI and VII infra. Similarly, since Reaction Product K (Example 3) involved the addition reaction of a weight ratio of 19.2 parts of Ucon Lubricant 50HB660 and 0.8 part of 80/20 TDI, there were employed 19.2 parts of Ucon Lubricant 50HB660.

In a manner similar to Example 5 supra in the preparation of Reaction Product J-2, there were charged 6500 gms of Butyl Carbitol to a 12 liter flask and heated to 68° C. The 80/20 TDI was added to the flask in three increments and the exotherm recorded. The total amount of 80/20 TDI added was 3500 gms. There was obtained a clear, slightly viscous, medium amber liquid product with a viscosity of 7010 centipoises at 21° C. and 2537 centipoises at 35° C. (hereinafter Reaction Product J-3).

Reaction Product J-3, TP-90B, Butyl Carbitol and Ucon 50HB660 were examined for compatibility with Polyester A** with/without ethylene glycol extender. The results are set forth in Table VI infra.

Hand foam experiments were conducted using TP-90B, Reaction Product J-3, Butyl Carbitol, and Ucon Lubricant 50HB660 with Polyester A** in typical foam formulations. The foam made with Butyl Carbitol was cheezy and did not develop any strength with cure, while the foam made with unreacted Ucon Lubricant 50HB660 had a good, strong skin. Plaques were prepared by the hand foaming technique and cast into an epoxy mold held at about 30°–35° C. It was noted that the Ucon Lubricant 50HB660 and the Reaction Product J-3 plaques exhibited superior flex properties when compared to a blank without flow modifier and with a plaque containing TP-90B. Data and results are shown in Table VII infra.

TABLE VI

| FORMULATION | 1 | 2 | 3 | 4 | 5 | 6 | 7 | 8 |
|---|---|---|---|---|---|---|---|---|
| Polyester A | 80.0 | 80.0 | 80.0 | 80.0 | 80.0 | 80.0 | 80.0 | 80.0 |
| TP-90B** | 20.0 | 20.0 | | | | | | |
| BUTYL CARBITOL** | | | 13.0 | 13.0 | | | | |
| UCON Lubricant 50HB660** | | | | | 19.2 | 19.2 | | |
| Reaction Product J-3 | | | | | | | 20.0 | 20.0 |
| Ethylene Glycol | | 11.0 | | 11.0 | | 11.0 | | 11.0 |
| Viscosity (centipoises) ($\times 10^3$) at 23° C. | 6.72 | 3.72 | 8.40 | 4.06 | 22.5 | 11.0 | 27.2 | 12.6 |
| Observations | 1 | 2 | 1 | 1 | 3 | 3 | 1 | 2 |

1 = clear and compatible
2 = hazy
3 = separated

TABLE VII

| FORMULATION | 1 | 2 | 3 | 4 | 5 |
|---|---|---|---|---|---|
| Polyester A | 80.0 | 80.0 | 80.0 | 80.0 | 80.0 |
| TP-90B** | 20.0 | — | — | — | — |
| Reaction Product J-3 | — | 20.0 | — | — | — |
| BUTYL CARBITOL** | — | — | 13.0 | — | — |
| UCON 50HB660** | — | — | — | 19.2 | — |
| Ethylene Glycol | 11.0 | 11.0 | 11.0 | 11.0 | 11.0 |
| L-5340** | 0.1 | 0.1 | 0.1 | 0.1 | 0.1 |
| Silcone A** | 0.2 | 0.2 | 0.2 | 0.2 | 0.2 |
| DABCO 33LV** | 0.9 | 0.9 | 0.9 | 0.9 | 0.9 |
| N,N,N',N'—tetramethyl-butanediamine | 0.3 | 0.3 | 0.3 | 0.3 | 0.3 |
| SYNCAT M 601** | 0.1 | 0.1 | 0.1 | 0.1 | 0.1 |
| FREON 113** | 10.0 | 10.0 | 10.0 | 10.0 | 10.0 |
| MONDUR E501** | 93.6 | 93.6 | 111.2 | 95.7 | 93.6 |
| Index | 1.0 | 1.0 | 1.0 | 1.0 | 1.0 |
| Cream Time (sec) | 20 | 18 | 20 | 15 | 15 |
| Rise Time (sec) | 50 | 45 | 50 | 30 | 50 |
| Tack Free Time (sec) | 60 | 55 | 68 | 50 | 60 |
| Snap Time (sec) | 120 | 110 | 210+ | 100 | 100 |
| Demold Time (min.) | 5 | 5 | 5 | 5 | 5 |
| Plaque Density (g./cc) | 0.52 | 0.52 | 0.49 | 0.50 | 0.49 |
| Cells per cm. | >60 | >70 | >60 | >70 | >70 |
| Hardness (Shore A) (ASTM D2240-75) | 71 | 74 | 67 | 72 | 84 |
| Ross Flex at −18° C. ($\times 10^3$ cycles) at 500% cut growth | 73.4 | >210 | 0.2 | >210 | 5.4 |
| Observations | 1 | 1 | 2 | 1 | 1 |

1 = good part - no shrinkage noted
2 = cheezy - no strength

EXAMPLE 8

A series of foam formulations comprising Reaction Product J-3, Ucon Lubricant 50HB660, or TP-90B were prepared and run on a Desma two component foam machine (Desma Werke GMbH, 2807, Achim bei Bremen, Germany). Component A of the formulations comprised Polyester A with/without Reaction Product J-3, Ucon Lubricant 50HB660 or TP-90B plus ethylene glycol extender, surfactants, catalysts, and fluorocarbon blowing agent; Component B consisted of the polyisocyanate (Mondur E-501). Component A was maintained at 30° C. and Component B at 32° C. in pressurized tanks under constant agitation to prevent phase separation. The foam mix was cast into aluminum mold cavities 6 inches × 8 inches × 0.5 inch thick which was held at a temperature of 46° C. Test plaques of varied densities were prepared. The data and results are shown in Table VIII infra.

TABLE VIII

| FORMULATION | 1 | 2 | 3 | 4 | 5 |
|---|---|---|---|---|---|
| Polyester A** | 80.0 | 90.0 | 80.0 | 90.0 | 80.0 |
| TP-90B** | 20.0 | | | | |
| Reaction Product J-3 | | 10.0 | 20.0 | | |
| UCON Lubricant 50HB660** | | | | 10.0 | 20.0 |
| Ethylene Glycol | 11.0 | 11.0 | 11.0 | 11.0 | 11.0 |
| L5340** | 0.1 | 0.1 | 0.1 | 0.1 | 0.1 |
| Silicone A** | 0.2 | 0.2 | 0.2 | 0.2 | 0.2 |
| DABCO 33LV** | 0.9 | 0.9 | 0.9 | 0.9 | 0.9 |
| N,N,N',N'—tetra-methylbutanediamine | 0.3 | 0.3 | 0.3 | 0.3 | 0.3 |
| SYNCAT M 601** | 0.1 | 0.1 | 0.1 | 0.1 | 0.1 |
| FREON 113** | 10.0 | 10.0 | 10.0 | 10.0 | 10.0 |
| MONDUR E501** | 94.2 | 96.1 | 94.4 | 97.2 | 96.7 |
| Index | 1.0 | 1.0 | 1.0 | 1.0 | 1.0 |
| Cream Time (sec) | 8–10 | 6 | 6 | 6 | 5 |
| Rise Time (sec) | 28 | 25 | 30 | 18 | 18 |
| Tack Free Time (sec) | 35 | 30 | 35 | 30 | 30 |
| Snap Time (sec) | 70 | 60 | 70 | 60 | 70 |
| Demold Time (min) | 3 | 3 | 3 | 3 | 3 |
| Free blow density (lbs./ft$^3$) | 14.6 | 10.8 | 10.9 | 12.0 | 11.2 |
| Plaque density (g./cc.) | 0.50  0.55  0.47 | 0.51  0.54  0.46 | 0.50  0.55  0.51 | 0.54  0.45  0.51 | 0.55 |
| Hardness (Shore A) (ASTM D2240-75) | 67  71  70 | 73  75  67 | 70  73  71 | 73  64  69 | 71 |
| Tensile (ASTM D412-75) | | | | | |
| Break (psi) | 486.8  617.5  626.5 | 575.4  693.2  585.3 | 641.0  583.1  616.3 | 547.9  511.1  600.5 | 575.8 |
| Elongation (%) | 327.5  390.0  355 | 315.  332.5  376.3 | 382.0  325.0  370.0 | 316.3  350.0  395.0 | 365.0 |
| Tear (pli) (ASTM D624-73) | 132.5  146.4  130.7 | 152.3  153.9  133.1 | 148.5  161.1  161.1 | 170.3  134.9  146.4 | 145.7 |
| Ross Flex at −18° C. | | | | | |
| % Cut Growth | | | | | |
| at 25,000 cycles | 40  48  120. | 340.  655.  40 | none  245.  140 | 480  5  33. | 23. |
| at 30,000 cycles | 60  70  210. | 565.  900.  58 | 5  660.  235 | complete  15  53 | 40 |
| 500% Cut Growth (× 10$^3$ cycles) | 54.0  40.0  35.4 | 30.8  23.4  56.8 | 73.8  29.8  37.0 | 24.8  63.0  63.0 | 63.0 |
| Ross Flex at 23° C. | | | | | |
| % Cut Growth | | | | | |
| at 25,000 cycles | 373.  440.  293. | 538  complete  10 | 43  235.  93. | 305.  68.  40 | 145 |
| at 30,000 cycles | 773.  735.  680. | 563  complete  10 | 58  555.  145. | 558.  95.  58 | 223. |
| 500% Cut Growth (× 10$^3$ cycles) | 27.4  26.7  30.2 | 29.8  18.1  98.9 | 67.4  35.2  45.3 | 33.6  67.6  65.8 | 46. |

EXAMPLES 9–26

Flow modifiers (Reaction Products A, C, G, H and K) were examined for compatibility with Isonate 240, Mondur E-501, and Mondur PF** (isocyanato-terminated prepolymers). Each flow modifier was tested at three concentrations by weight (90 parts isocyanate/10 parts flow modifier, 80 parts isocyanate/20 parts flow modifier and 70 parts isocyanate/30 parts flow modifier). Karl Fischer tests (ASTM D-2849) for % H$_2$O show no detectable levels of water. The samples were prepared by weighing into a test tube the following:

|  | 90/10 | 80/20 | 70/30 |
|---|---|---|---|
| Flow Modifier (gms) | 1.5 | 3.0 | 4.5 |
| Isocyanate (gms) | 13.5 | 12.0 | 10.5 |

The test tubes were tightly capped and heated to 70° C. for 20–30 minutes. The samples were agitated by vigorous shaking while hot and observations with respect to miscibility at this temperature (70° C.) were made. The samples were cooled in a constant temperature bath to 25° C. for 4–6 hours and the observations at 25° C. were then made. Compatible mixtures were then further cooled in a constant temperature bath to 20° C., 15° C., 10° C., 5° C., 0° C., −5° C., and −10° C., respectively, and allowed to remain at each temperature for a minimum of 24 hours. Observations regarding separation, cloud point (the temperature when haze is first observed), and freezing point (the temperature when crystals are first observed) were made at each temperature interval. A 15 gram sample of Isonate 240, Mondur E-501, Mondur PF was tested as controls. Hazy mixtures at 25° C. were subjected to further treatment as indicated in the footnotes of Tables IX, X, and XI. The data are set forth in Tables IX, X, and XI.

TABLE IX

COMPATIBILITY AND FREEZE POINT DETERMINATION IN ISONATE 240**

| No. | FLOW MODIFIER | CONCENTRATION BY WEIGHT | COMPATIBILITY @ 70° C. | COMPATIBILITY @ 25° C. | SEPARATION POINT, °C. | CLOUD POINT, °C. | FREEZE POINT, °C. |
|---|---|---|---|---|---|---|---|
| 9. | Reaction Product A | 10 | YES | YES[1] | — | 0° C. | 0° C. |
|  |  | 20 | YES | YES[1] | — | 0° C. | 0° C. |

TABLE IX-continued

COMPATIBILITY AND FREEZE POINT DETERMINATION IN ISONATE 240**

| No. | FLOW MODIFIER | CONCENTRATION BY WEIGHT | COMPATIBILITY @ 70° C. | COMPATIBILITY @ 25° C. | SEPARATION POINT, °C. | CLOUD POINT, °C. | FREEZE POINT, °C. |
|---|---|---|---|---|---|---|---|
| | (Butyl Carbitol/ TDI) | 30 | YES | YES[1] | 5° C. | 0° C. | 0° C. |
| 10. | Reaction Product C (Methyl Carbitol/ TDI) | 10 20 30 | YES YES YES | Sl. HAZE[1,4] Sl. HAZE[1,4] Sl. HAZE[1,4] | 20° C. 20° C. 20° C. | >5° C. 5° C. 0° C. | 0° C. 0° C. 0° C. |
| 11. | Reaction Product G (Butyl Carbitol/ Isonate 125M) | 10 20 30 | HAZY HAZY HAZY | WHITE[1,4] WHITE[1,4] WHITE[1,4] | — — — | — — — | N.T.[6] N.T.[6] N.T.[6] |
| 12. | Reaction Product H (Butyl Carbitol/ Mondur MR) | 10 20 30 | YES YES YES | YES[1] YES[1] YES[1] | — — — | 5° C. 5° C. 5° C. | 5° C. 5° C. 0° C. |
| 13. | Reaction Product L (UCON 50HB660/TDI) | 10 20 30 | YES YES YES | YES[1] YES[1] YES[1] | — — — | 0° C. 0° C. −10° C. | 0° C. −5° C. −10° C. |
| 14. | ISONATE 240** Control | NONE | — | — | — | 4° C.[5] | 4° C.[5] |

FOOTNOTES:
[1] Test tube heated to 70° C. for 20–30 minutes, the contents agitated by vigorous shaking, and then allowed to cool to 25° C. and maintained thereat for 4–6 hours. Compatible mixtures were further cooled as stated previously.
[2] These mixtures were not compatible at 70° C. and some reaction with the isocyanate was observed. It appears that catalyst may have been present in the mixture. The flow modifier was analyzed for % $H_2O$ and showed no detectable levels of water present.
[3] Test tube was reheated to 80° C., contents were reagitated and held at 80° C. for one hour, and then allowed to cool to 22° C. for at least 4–6 hours.
[4] Test tube was reheated to 80° C., contents were reagitated and held at 80° C. for 16 hours, and then allowed to cool for at least 16 hours.
[5] After 16 hours at 4° C. control is a solid mass indicating that crystal formation occurs appreciably above 4° C.
[6] Not tested.

TABLE X

COMPATIBILITY AND FREEZE POINT DETERMINATION IN MONDUR E-501

| No. | FLOW MODIFIER | CONCENTRATION BY WEIGHT | COMPATIBILITY @ 70° C. | COMPATIBILITY @ 25° C. | SEPARATION POINT, °C. | CLOUD POINT, °C. | FREEZE POINT, °C. |
|---|---|---|---|---|---|---|---|
| 15. | Reaction Product A (Butyl Carbitol/ TDI) | 10 20 30 | YES YES YES | YES[1] YES[1] YES[1] | — — 5° C. | 0° C. 0° C. — | 0° C. −5° C. −5° C. |
| 16. | Reaction Product C (Methyl Carbitol/ TDI) | 10 20 30 | YES YES YES | YES[1] YES[1] YES[1] | — — — | 0° C. 0° C. 0° C. | −5° C. 0° C. −5° C. |
| 17. | Reaction Product G (Butyl Carbitol/ Isonate 125M) | 10 20 30 | YES Slight Haze Slight Haze | YES[1,2] HAZY[1,2] HAZY[1,2] | — — — | 15° C. >25° C. >25° C. | −5° C. −5° C. −5° C. |
| 18. | Reaction Product H (Butyl Carbitol/ Mondur MR) | 10 20 30 | YES YES YES | YES[1] YES[1] YES[1] | — — — | 10° C. 5° C. 5° C. | 5° C. 0° C. 0° C. |
| 19. | Reaction Product L (UCON 50HB660/TDI) | 10 20 30 | YES YES YES | YES[1] YES[1] YES[1] | — — — | — −5° C. −5° C. | −5° C. −10° C. −10° C. |
| 20. | MONDUR E-501 Control | None | — | — | — | 4° C.[3] | 4° C.[3] |

[1] See footnote (1), Table IX.
[2] See footnote (2), Table IX.
[3] See footnote (5), Table IX.

TABLE XI

COMPATIBILITY AND FREEZE POINT DETERMINATION IN MONDUR PF

| No. | FLOW MODIFIER | CONCENTRATION BY WEIGHT | COMPATIBILITY @ 70° C. | COMPATIBILITY @ 25° C. | SEPARATION POINT, °C. | CLOUD POINT, °C. | FREEZE POINT, °C. |
|---|---|---|---|---|---|---|---|
| 21. | Reaction Product A (Butyl Carbitol/ TDI) | 10 20 30 | YES YES YES | YES[1] YES[1] YES[1] | — — 5° C. | N.N.[2] N.N.[2] N.N.[2] | 5° C. 0° C. 0° C. |
| 22. | Reaction Product C (Methyl Carbitol/ TDI) | 10 20 30 | YES YES YES | YES[1] YES[1] YES[1] | — — 20° C. | N.N.[2] 5° C. 20° C. | 5° C. 5° C. 0° C. |
| 23. | Reaction Product G (Butyl Carbitol/ | 10 20 30 | YES YES YES | YES[1] YES[1,3] Sl. HAZY[1,3] | — — 0° C. | N.N.[2] 20° C. 25° C. | 5° C. 5° C. 0° C. |

TABLE XI-continued

| | | COMPATIBILITY AND FREEZE POINT DETERMINATION IN MONDUR PF | | | | |
|---|---|---|---|---|---|---|
| | | CONCENTRATION | COMPATIBILITY | | SEPARATION | CLOUD | FREEZE |
| No. | FLOW MODIFIER | BY WEIGHT | @ 70° C. | @ 25° C. | POINT, °C. | POINT, °C. | POINT, °C. |
| | Isonate 125M) | | | | | | |
| 24. | Reaction | 10 | YES | YES[1] | — | 15° C. | 5° C. |
| | Product H | 20 | YES | YES[1] | — | 5° C. | 5° C. |
| | (Butyl Carbitol/ Mondur MR) | 30 | YES | YES[1] | — | 5° C. | 0° C. |
| 25. | Reaction | 10 | YES | YES[1] | — | N.N.[2] | 10° C. |
| | Product L | 20 | YES | YES[1] | — | 5° C. | 5° C. |
| | (UCON 50HB660/TDI) | 30 | YES | YES[1] | — | N.N.[2] | 0° C. |
| 26. | MONDUR PF** Control | NONE | — | — | — | N.N.[2] | 10° C.[4] |

FOOTNOTES:
[1]Test tube heated to 70° C. for 20-30 minutes, the contents agitated by vigorous shaking, and then allowed to cool to 25° C. and maintained thereat for 4-6 hours. Compatible mixtures were further cooled as stated previously.
[2]None notices.
[3]Test tube was reheated to 80° C., contents were reagitated and held at 80° C. for one hour, and then allowed to cool to 22° C. for at least 4-6 hours.
[4]After 16 hours about half solid mass.

EXAMPLE 27

Preparation of Solid Polyurethane Elastomer

To a 500 ml reaction flask there were charged 200 gms of Niax Diol 12-56 and 67 gms of Reaction Product I. The resulting mixture was then degassed in a vacuum of 5-10 mm Hg at 100° C. for 1.5 hours. Thereafter, 10.0 gms of ethylene glycol and 0.3 gm of phenylmercuric propionate catalyst (Netasol DPG; 80% dipropylene glycol, 20% active mercury compound) were added, and the resulting mixture was allowed to cool to 30° C., where it was subjected to a vacuum of 20 mm Hg for five minutes. The vacuum was broken, and a total of 98 gms of MONDUR PF was added at 30° C. with good agitation. The reaction product mixture was degassed quickly and cast into a warm ¼" aluminum mold cavity having a dimension of 6"×8". The reaction product gelled in 5-6 minutes. There was obtained a strong, tough polyurethane elastomer exhibiting a Shore A hardness of 55-60, and was found to possess an electrical resistance that was appreciably lower than the product made from the same formulation but not containing Reaction Product I. This property of electrical resistance imparts utility in elastomeric applications requiring antistatic properties.

EXAMPLE 28

A flexible polyether/polyurethane foam was prepared from Niax Polyol 11-27**, Reaction Product K, and the 80/20 mixture of 2,4- and 2,6-tolylene diisocyanate. The following foam recipe was employed

| Niax Polyol 11-27 | 200 gms |
|---|---|
| Reaction Product I | 100 gms |
| Silicone Surfactant L-548** | 1.0 gm |
| Diethanolamine | 1.0 gm |
| Water | 5.6 gms |
| Dabco 33 LV** | 0.6 gm |
| Dibutyltin dilaurate | 0.02 gm |
| 80/20 mixture of 2,4- and 2,6-tolylene diisocyanate | 69.0 gms |

(Isocyanate index = 105)

The ingredients were mixed at about 1500 rpm by means of a laboratory mixer, poured into a paper mold, allowed to rise and cure at room temperature for about 30 minutes. The resulting foamed product was dry to the touch.

After one week, the foam was cut into one inch thick slabs. The foam exhibited good strength characteristics and was found to exhibit a substantially lower electrical resistivity than the foamed product made from the corresponding formulation without flow modifier. This property highlights the utility of the foamed product as an antistatic carpet underlayment in computer rooms and the like.

What is claimed is:

1. A polyurethane product prepared by reacting a mixture comprising (a) a polyol having a molecular weight in the range of from about 1800 to about 10,000, (b) an organic polyisocyanate, (c) optionally, a chain extender, and (d) a catalyst for accelerating the NCO-/active hydrogen reaction, in the presence of (e) a blowing agent and (f) from about 5 to about 50 parts by weight, per 100 parts by weight of said polyol, of a non-hydroxyl flow modifier, said flow modifier having the following characteristics: (i) a boiling point above about 150° C., (ii) normally-liquid or low melting solid forming a compatible liquid with said polyol, (iii) an average molecular weight upwards to about 3000, (iv) consisting essentially of carbon and hydrogen atoms in the form of monovalent or polyvalent hydrocarbon groups; and from 1 to 5 urethane

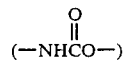

groups; and from 1 to 25 oxyalkylene groups per urethane group.

2. The polyurethane product of claim 1 wherein said flow modifier is of the group consisting of Formula I infra:

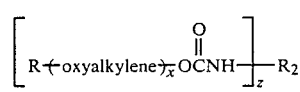

wherein the oxyalkylene unit contains from 2 to 4 carbon atoms in the oxyalkylene chain; wherein each R, individually, represents a monovalent acyclic, alicyclic or aromatic group; wherein x is at least one and upwards to 25; wherein z is from 1 to 5; and wherein $R_2$ represents a monovalent acyclic, alicyclic or aromatic group when z is 1 or a polyvalent acyclic, alicyclic or aromatic group when z is 2 to 5, the valence of $R_2$ being equal to the value of z; and Formula II infra:

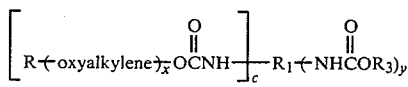

wherein R, x and oxyalkylene have the meanings assigned in Formula I supra, wherein $R_1$ is a polyvalent acyclic, alicyclic, or aromatic group having the polyvalent meanings assigned to $R_2$ of Formula I supra, the valence of $R_1$ being equal to c plus y, wherein each $R_3$ individually is an acyclic, alicyclic or aromatic group; wherein y has a value of 1 to 2; and wherein c has a value of 1 to 2.

3. The polyurethane product of claim 2 wherein said product is of the group consisting of cellular products and solid products.

4. The polyurethane product of claim 3 wherein the reaction is effected in the presence of from 5 to 35 parts of said flow modifier and an organic blowing agent as the primary blowing agent, and wherein said product is a microcellular polyurethane elastomer.

5. The polyurethane product of claim 4 wherein the reaction is effected in the presence of from 10 to 30 parts of said flow modifier and wherein said product is an integral skin microcellular elastomer.

6. The polyurethane product of claim 5 wherein said organic polyisocyanate is a quasi-prepolymer of a 4,4'-diphenylmethane diisocyanate and wherein said product is in the shape of a shoe sole.

7. The polyurethane product of claim 3 wherein the reaction is effected in the presence of from 20 to 50 parts of said flow modifier and wherein said product is a polyurethane foam.

8. The polyurethane product of claim 3 wherein the reaction is effected in the presence of from 5 to 20 parts of said flow modifier and wherein said product is a soft polyurethane elastomer.

9. The polyurethane product of claim 2 wherein the oxyalkylene units in Formulas I and II are oxyethylene units.

10. A polyurethane product prepared according to claim 1 wherein said flow modifier has the structural formula:

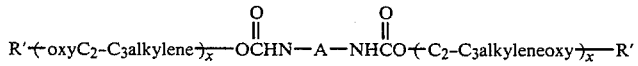

wherein each R', individually, is $C_1$–$C_8$alkyl or a $C_5$–$C_7$-cycloalkyl; wherein A represents $C_1$–$C_8$alkylene, unsubstituted and $C_1$–$C_3$alkyl-substituted phenylene, divalent (4,4'- and 4,4'-/4,2'-)diphenylenemethane, the divalent hydrogenated counterparts of unsubstituted and $C_1$–$C_3$alkyl-substituted phenylene or (4,4'- and 4,4'-/4,2'-)diphenylenemethane; wherein X is at least one and upwards to 25; and wherein the oxy$C_2$–$C_3$alkylene unit is oxyethylene, oxypropylene, oxyethyleneoxypropylene, or mixtures thereof.

11. The polyurethane product prepared according to claim 10 wherein the mixture includes an organic blowing agent and from 10 to 30 parts of flow modifier and wherein said product is an integral skin microcellular elastomer.

12. The polyurethane product of claim 10 wherein the mixture includes an organic blowing agent and from about 5 to 20 parts of flow modifier and wherein said product is a microcellular elastomer.

13. The polyurethane product of claim 10 wherein the oxy$C_2$–$C_3$alkylene unit in the formula is oxyethylene.

14. The polyurethane product of claim 11 wherein the divalent A variable in the flow modifier formula is tolylene or diphenylenemethane and wherein said product is a cellular product.

15. The cellular product of claim 14 wherein the oxy$C_2$–$C_3$alkylene unit in the formula is oxyethylene.

16. A polyurethane elastomer product prepared according to claim 1 wherein the reaction is effected in the presence of from 5 to 20 parts of flow modifier having the structural formula:

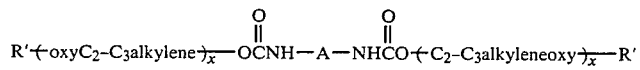

wherein each R', individually, is $C_1$–$C_8$alkyl or a $C_5$–$C_7$-cycloalkyl; wherein A represents $C_1$–$C_8$alkylene, unsubstituted and $C_1$–$C_3$alkyl-substituted phenylene, divalent (4,4'- and 4,4'-/4,2'-)diphenylenemethane, the divalent hydrogenated counterparts of unsubstituted and $C_1$–$C_3$alkyl-substituted phenylene or (4,4'- and 4,4'-/4,2'-)diphenylenemethane; wherein x is at least one and upwards to 25; and wherein the oxy$C_2$–$C_3$alkylene unit is oxyethylene, oxypropylene, oxyethyleneoxypropylene, or mixtures thereof.

17. The polyurethane elastomer product of claim 16 wherein the oxy$C_2$–$C_3$alkylene unit in the flow modifier formula is oxyethylene.

18. As an isocyanate curable composition, for the manufacture of polyurethane products, a compatible homogeneous liquid mixture comprising (a) a polyol as defined in claim 2, and (b) from 5 to about 50 parts per 100 parts of polyol, of a flow modifier as defined in claim 2.

19. The homogeneous liquid mixture of claim 18 which contains a chain extender.

20. The homogeneous liquid mixture of claim 18 wherein said polyol is a polyether polyol.

21. The homogeneous liquid mixture of claim 19 wherein said polyol is a polyester polyol.

22. As an isocyanate curable composition, for the manufacture of polyurethane foamed products characterized by its capability to conduct static electricity, a compatible homogeneous liquid mixture comprising (a) a polyol as defined in claim 2, and (b) from 20 to about 50 parts, per 100 parts of polyol, of a flow modifier as defined in claim 2.

23. As an isocyanate curable composition, for the manufacture of integral skin microcellular polyurethane products, a liquid mixture comprising (a) a polyester polyol containing from 2 to 3 hydroxyl groups and possessing a molecular weight in the range of from about 1800 to about 10,000, (b) from 10 to about 30 parts, per 100 parts of polyester polyol, of a flow modifier as defined in claim 2, and (c) a chain extender of the group consisting of glycols, triols, aminoalcohols, polyamines and mixtures thereof.

24. The liquid mixture of claim 23 which contains a a catalyst for accelerating the NCO/active hydrogen reaction.

25. The homogeneous liquid mixture of claim 24 wherein the oxyC$_2$–C$_3$alkylene group in the flow modifier formula is oxyethylene.

26. A microcellular polyester polyurethane elastomer characterized by cell diameters of from about 0.3 to 0.01 mm, a density of from 160 to 900 kg/m$^3$, and good low temperature flex property determined in accordance with ASTM D-1052, prepared by reacting a mixture comprising (a) a polyester polyol having a molecular weight in the range of from about 1800 to about 10,000, (b) an organic polyisocyanate, (c) a chain extender, and (d) a catalyst for accelerating the NCO/active hydrogen reaction, in the presence of (e) an organic blowing agent as the primary blowing agent, and (f) from about 5 to about 35 parts by weight, per 100 parts by weight of said polyester polyol, of a non-hydroxyl flow modifier, said flow modifier having the following characteristics: (i) a boiling point above about 150° C., (ii) normally-liquid or low melting solid forming a compatible liquid with said polyol, (iii) an average molecular weight upwards to about 3000, (iv) consisting essentially of carbon and hydrogen atoms in the form of monovalent or polyvalent hydrocarbon groups; and from 1 to 5 urethane

(—NHCO—)

groups; and from 1 to 25 oxyalkylene groupe per urethane group.

27. The microcellular elastomer of claim 26 wherein said organic polyisocyanate is an aromatic polyisocyanate characterized by a methylene group, each valence of which is separately bonded to a carbon atom of a benzenoid nucleus, and wherein said chain extender is of the group consisting of glycols, triols, amino alcohols, polyamines and mixtures thereof.

28. The microcellular elastomer of claim 27 wherein said organic polyisocyanate is a quasi-polyester prepolymer formed by reacting the polyisocyanate compound and polyester polyol in a ratio of NCO groups to OH groups of at least about 2.5:1.

29. The microcellular elastomer of claim 28 wherein said organic polyisocyanate is a diphenylmethane diisocyanate.

30. The elastomer of claim 29 wherein the reaction is effected in a closed mold and wherein said elastomer is an integral skin microcellular elastomer.

31. The integral skin microcellular elastomer of claim 29 in the form of a shoe sole.

32. The integral skin microcellular elastomer of claim 30 wherein the reaction is effected in the presence of from about 10 to 30 parts of said flow modifier.

33. A multipackage curable composition useful in the manufacture of microcellular elastomers comprising Package A and Package B,
(a) wherein said Package A consists essentially of a mixture of polyester polyol, flow modifier, organic blowing agent, and a catalyst for accelerating the NCO/active hydrogen polyurethane reaction, said polyester polyol and said flow modifier being present in amounts which provide from about 5 to about 35 parts by weight of flow modifier per 100 parts by weight of polyester polyol, (i) said polyester polyol having a molecular weight of from about 1,800 to about 10,000, and (ii) said flow modifier being defined by claim 2;
(b) wherein said Package B is an organic polyisocyanate.

34. The multipackage curable composition of claim 33 useful in the manufacture of integral skin microcellular polyurethane elastomers in a closed mold wherein said polyester polyol contains from 2 to 3 hydroxyl groups, and wherein said organic polyisocyanate is a quasi-polyester prepolymer, the ratio of NCO groups of the prepolymer to OH groups of the polyol being at least about 2.5:1.

35. The multipackage curable composition of claim 34 wherein said polyester polyol has a molecular weight of from about 2000 to 5000, and wherein said quasi-polyester prepolymer is the reaction product of a diphenylmethane diisocyanate and a polyester polyol.

36. The multipackage curable composition of claim 35 wherein said flow modifier is of the group consisting of Formula V infra:

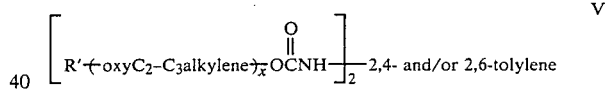

wherein each R', individually, is of the group consisting of alkyl and phenyl; wherein x is from 2 to 8; and wherein oxyC$_2$–C$_3$alkylene is oxyethylene, oxypropylene, or oxyethyleneoxypropylene; and Formula VI infra:

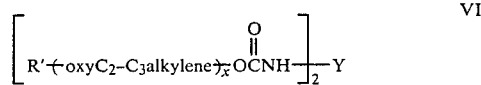

wherein Y represents a 4,4'- and/or 2,4'-diphenylenemethane or C$_4$–C$_6$alkylene; and wherein R', x, and the oxyC$_2$–C$_3$alkylene unit have the meanings assigned in Formula V above.

* * * * *